US012793162B2

(12) United States Patent
Ma et al.

(10) Patent No.: US 12,793,162 B2
(45) Date of Patent: Nov. 10, 2026

(54) RENDERING DELAY AWARE PACKET PACING FOR REAL TIME MULTIMEDIA APPLICATIONS

(71) Applicant: QUALCOMM Incorporated, San Diego, CA (US)

(72) Inventors: Liangping Ma, San Diego, CA (US); Nikolai Konrad Leung, San Francisco, CA (US); Imed Bouazizi, Frisco, TX (US); Thomas Stockhammer, Bergen (DE)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 18/536,086

(22) Filed: Dec. 11, 2023

(65) Prior Publication Data

US 2025/0191105 A1 Jun. 12, 2025

(51) Int. Cl.
*G06T 1/20* (2006.01)

(52) U.S. Cl.
CPC .................................... *G06T 1/20* (2013.01)

(58) Field of Classification Search
CPC ..... G06T 1/20; H04L 21/23805; H04L 21/24; H04L 47/283; H04L 65/65; H04L 65/70; H04L 65/80
USPC ........................................................ 345/501
See application file for complete search history.

(56) References Cited

U.S. PATENT DOCUMENTS 7,567,513 B2 * 7/2009 Cho ..................... H04L 1/0009 370/428
2005/0002337 A1 * 1/2005 Wang ..................... H04L 65/80 370/235
2009/0252227 A1 * 10/2009 NepomucenoLeung .................... H04N 19/507 375/E7.279
2012/0281715 A1 * 11/2012 Shojania ............. H04L 43/0882 370/468
2012/0307885 A1 * 12/2012 Agarwal ............. H04W 72/569 375/E7.126
2015/0103660 A1 * 4/2015 Roskind .................. H04L 47/11 370/235
2015/0172155 A1 6/2015 Hong et al.

(Continued)

FOREIGN PATENT DOCUMENTS

CN 110881136 B 11/2021
WO 2023052533 A1 4/2023

OTHER PUBLICATIONS

Songyang Zhang et al., Congestion Control and Packet Scheduling for Multipath Real Time Video Streaming, IEEE Access, vol. 7, Apr. 2019, pp. 59758-59770.*

(Continued)

*Primary Examiner* — Jacinta M Crawford

(74) *Attorney, Agent, or Firm* — Procopio, Cory, Hargreaves & Savitch LLP

(57) ABSTRACT

This disclosure provides systems, devices, apparatus, and methods, including computer programs encoded on storage media, for rendering delay aware packet pacing for real time multimedia applications. A processor of a first device transmits, to a second device, an indication of a processing delay associated with a set of packets associated with media content. The processor receives, from the second device, the set of packets in a packet arrival pattern that is based on the processing delay.

30 Claims, 12 Drawing Sheets

(56) References Cited

U.S. PATENT DOCUMENTS

| | | | | |
|---|---|---|---|---|
| 2015/0244650 | A1* | 8/2015 | Yang | H04L 49/552 348/180 |
| 2016/0037128 | A1* | 2/2016 | Van der Auwera | H04L 47/12 348/14.13 |
| 2016/0050149 | A1* | 2/2016 | de la Cruz | H04L 43/0852 370/230 |
| 2023/0275977 | A1* | 8/2023 | Begen | H04L 43/0852 709/217 |
| 2024/0405906 | A1* | 12/2024 | Danielsson | H04L 43/0864 |

OTHER PUBLICATIONS

International Search Report and Written Opinion—PCT/US2024/056735—ISA/EPO—Feb. 26, 2025.
Cai Y., et al., "Practical Packet Pacing in Small-Buffer Networks", Jun. 2009, IEEE International Conference on Communications, 7 Pages.
Jiang H., et al., "When Machine Learning Meets Congestion Control: A Survey and Comparison", Oct. 22, 2020, Networking and Internet Architecture, 23 Pages.
Mittal R., et al., TIMELY: RTT-Based Congestion Control for the Datacenter, Computer Communication Review, vol. 45, Issue 417, Aug. 2015, pp. 537-550.
Snyder J., et al., "Improving Congestion Control Convergence in RDMA Networks", Department of Computer Science, 2022, 177 Pages.

* cited by examiner

RENDERING DELAY AWARE PACKET PACING FOR REAL TIME MULTIMEDIA APPLICATIONS

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

In split rendering, densely packed packets may be suitable for a receiver device; however, sparsely packed packets may be suitable for a sending device. There is a need for improved split rendering techniques.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes a memory; and a processor coupled to the memory and, based on information stored in the memory, the processor is configured to: transmit, to a second device, an indication of a processing delay associated with a set of packets associated with media content; and receive, from the second device, the set of packets in a packet arrival pattern that is based on the processing delay.

In an aspect of the disclosure, a method, a computer-readable medium, and an apparatus are provided. The apparatus includes a memory; and a processor coupled to the memory and, based on information stored in the memory, the processor is configured to: compare the processing delay to a time gap between the set of packets and a second set of packets associated with the media content; transmit, to the second device, a second indication of an adjustment to the time gap based on the comparison; and receive, from the second device, the second set of packets based on the adjustment to the time gap.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
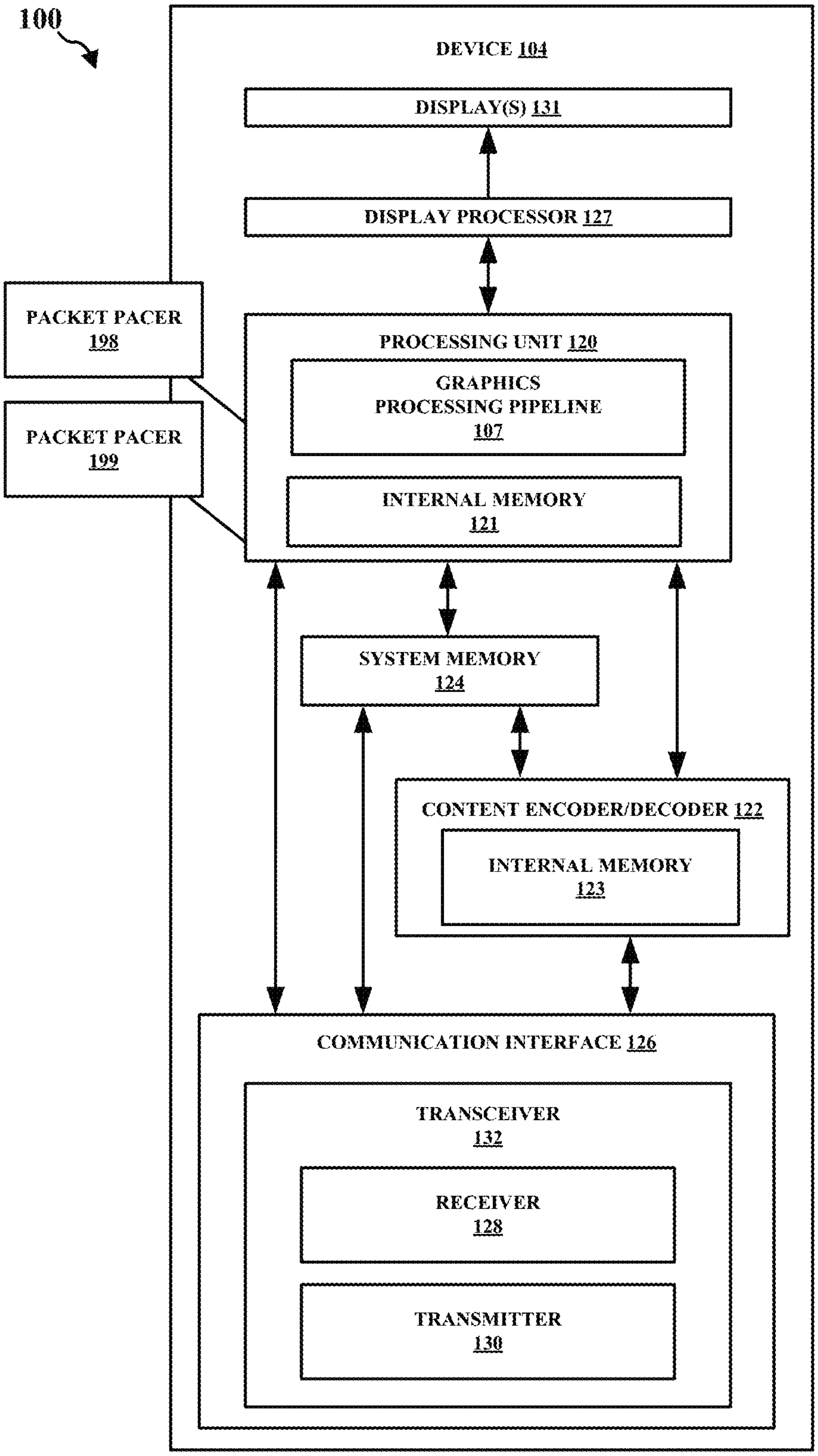
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

In a split rendering system, rendering tasks (as well as other tasks) may be divided between a receiver device (e.g., an extended reality (XR) headset worn by on/over a head of a user) and a sender device (e.g., a phone, a personal computer (PC), a server, etc.) that are in wired and/or wireless communication with one another in order to conserve battery power at the receiver device and in order to take advantage of processing capabilities of the sender device which may be relatively greater than processing capabilities of the receiver device. In an example, the receiver device may transmit pose information (i.e., head pose information) to the sender device, whereupon the sender device may render media content (e.g., video content, audio content, graphical content, haptics, etc.) based on the pose information. The sender device may transmit the media content to the receiver device. In the case of video content, the receiver device may perform a reprojection (i.e., in a rendering stage at the receiver device) on the video content based on latest available pose information in order to account for head movement of the user between a render time and a display time. The receiver device may present the reprojected video content on display(s) of the receiver device.

The sender device may transmit the media content to the receiver device in sets of packets that are transmitted over a wired connection and/or a wireless connection. In an example, a set of packets may be for a video frame. Spacings between each packet in the set of packets may vary based on a manner in which the sender device transmits the set of packets, that is, a time period that occurs between consecutive packets in the set of packets may vary based on the manner in which the sender device transmits the set of packets. In a "dense packing" scenario, the sender device may transmit the set of packets such that spacings between each packet in the set of packets are zero or are relatively small. Furthermore, in the dense packing scenario, the set of packets may not be evenly distributed with respect to a time duration corresponding to a frame rate (e.g., an inverse of a frame rate (1/frame rate)). In a "sparse packing" scenario, the sender device may transmit the set of packets such that spacings between each packet in the set of packets are relatively large. Furthermore, in the sparse packing scenario, the set of packets may be evenly (or nearly evenly) distributed with respect to a time duration corresponding to the inverse of the frame rate.

When the set of packets is densely packed, the receiver device may have a relatively greater amount of time to perform a reprojection (or other rendering) compared to a scenario in which the set of packets is sparsely packed, as the receiver device may receive the (full) set of packets in a shorter amount of time compared to an amount of time to receive the set of packets when the set of packets is sparsely packed. If the receiver device is not able to perform the reprojection in an allotted time, a previous frame may be presented to the user, which may impact a user experience of the user. As such, densely packed packets may be suitable for the receiver device; however, densely packed packets may not be suitable for the sender device and/or the network, as densely packed packets may cause issues with rate control and/or congestion control. When the set of packets is sparsely packed, the sender device may effectively perform rate control and/or congestion control, as the set of packets may be evenly distributed with respect to the time duration corresponding to the inverse of the frame rate. If rate control and/or congestion control is not effectively performed, network congestion may occur, which may impact the ability of the receiver device to receive the (full) set of packets, which may impact the user experience. As such, sparsely packed packets may be suitable for the sender device and/or the network; however, sparsely packed packets may not be suitable for the receiver device, as sparsely packed packets may reduce an amount of time that the receiver device has to perform the reprojection (or other rendering).

Various technologies pertaining to render delay aware packet packing are described herein. In an example, a first device transmits, to a second device, an indication of a processing delay associated with a set of packets associated with media content. The first device receives, from the second device, the set of packets in a packet arrival pattern that is based on the processing delay. A packet arrival pattern may refer to spacings (i.e., time intervals) between each of a set of received packets and/or a time gap between a last received packet in the set of packets and a first received packet in a next set of packets. Vis-à-vis transmitting the indication of processing delay and receiving the set of packets in a packet arrival pattern that is based on the processing delay, the first device may be able to facilitate balancing competing interests of rendering and congestion control, which may result in more efficient resource usage by the first device and/or a more efficient use of network resources. In another example, a first device receives, from a second device, an indication of a processing delay associated with a set of packets associated with media content. The first device determines a packet departure pattern for the set of packets associated with the media content based on the indication of the processing delay. A packet departure pattern may refer to spacings (i.e., time intervals) between each of a set of transmitted packets and/or a time gap between a last transmitted packet in the set of packets and a first transmitted packet in a next set of packets. The first device transmits, to the second device, the set of packets based on the packet departure pattern. Vis-à-vis transmitting the set of packets based on the packet departure pattern, the first device may be able to facilitate balancing competing interests of rendering and congestion control, which may result in more efficient resource usage by the first device and/or a more efficient use of network resources.

In split rendering, packets associated with a display time may be sent back-to-back. This type of "dense packet pacing" may be suitable for rendering, but may not be suitable for congestion control, where a more even or "sparse packet pacing" may be suitable. In one aspect described herein, a receiver may inform the processing delay to a sender during a multimedia session setup, e.g., via session description protocol (SDP). The processing delay may include: a rendering delay, a video/audio decoding delay, and/or an error concealment delay. The processing delay may be signaled as a single value, or components of the processing delay may be signaled separately. The sender may use the processing delay to determine a time interval during which the packets for a next display/presentation time are transmitted. In a case in which multiple media types (e.g., video, audio, haptic) are transmitted, the aforementioned procedure may be performed for each media type separately.

The examples describe herein may refer to a use and functionality of a graphics processing unit (GPU). As used herein, a GPU can be any type of graphics processor, and a graphics processor can be any type of processor that is designed or configured to process graphics content. For example, a graphics processor or GPU can be a specialized electronic circuit that is designed for processing graphics content. As an additional example, a graphics processor or GPU can be a general purpose processor that is configured to process graphics content.

A user may wear a display device in order to experienced extended reality (XR) content. XR may refer to a technology that blends aspects of a digital experience and the real world. XR may include augmented reality (AR), mixed reality (MR), and/or virtual reality (VR). In AR, AR objects may be superimposed on a real-world environment as perceived through the display device. In an example, AR content may be experienced through AR glasses that include a transparent or semi-transparent surface. An AR object may be projected onto the transparent or semi-transparent surface of the glasses as a user views an environment through the glasses. In general, the AR object may not be present in the real world and the user may not interact with the AR object. In MR, MR objects may be superimposed on a real-world environment as perceived through the display device and the user may interact with the MR objects. In some aspects, MR objects may include "video see through" with virtual content added. In an example, the user may "touch" a MR object being displayed to the user (i.e., the user may place a hand at a location in the real world where the MR object appears to be located from the perspective of the user), and the MR object may "move" based on the MR object being touched (i.e., a location of the MR object on a display may change). In general, MR content may be experienced through MR glasses (similar to AR glasses) worn by the user or through a head mounted display (HMD) worn by the user. The HMD may include a camera and one or more display panels. The HMD may capture an image of environment as perceived through the camera and display the image of the environment to the user with MR objects overlaid thereon. Unlike the transparent or semi-transparent surface of the AR/MR glasses, the one or more display panels of the HMD may not be transparent or semi-transparent. In VR, a user may experience a fully-immersive digital environment in which the real-world is blocked out. VR content may be experienced through a HMD.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, a GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a packet pacer 198 configured to transmit, to a second device, an indication of a processing delay associated with a set of packets associated with media content; and receive, from the second device, the set of packets in a packet arrival pattern that is based on the processing delay. In certain aspects, the processing unit 120 may include a packet pacer 199 configured to receive, from a second device, an indication of a processing delay associated with a set of packets associated with media content; determine a packet departure pattern for the set of packets associated with the media content based on the indication of the processing delay; and transmit, to the second device, the set of packets based on the packet departure pattern. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit or bits that indicate which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
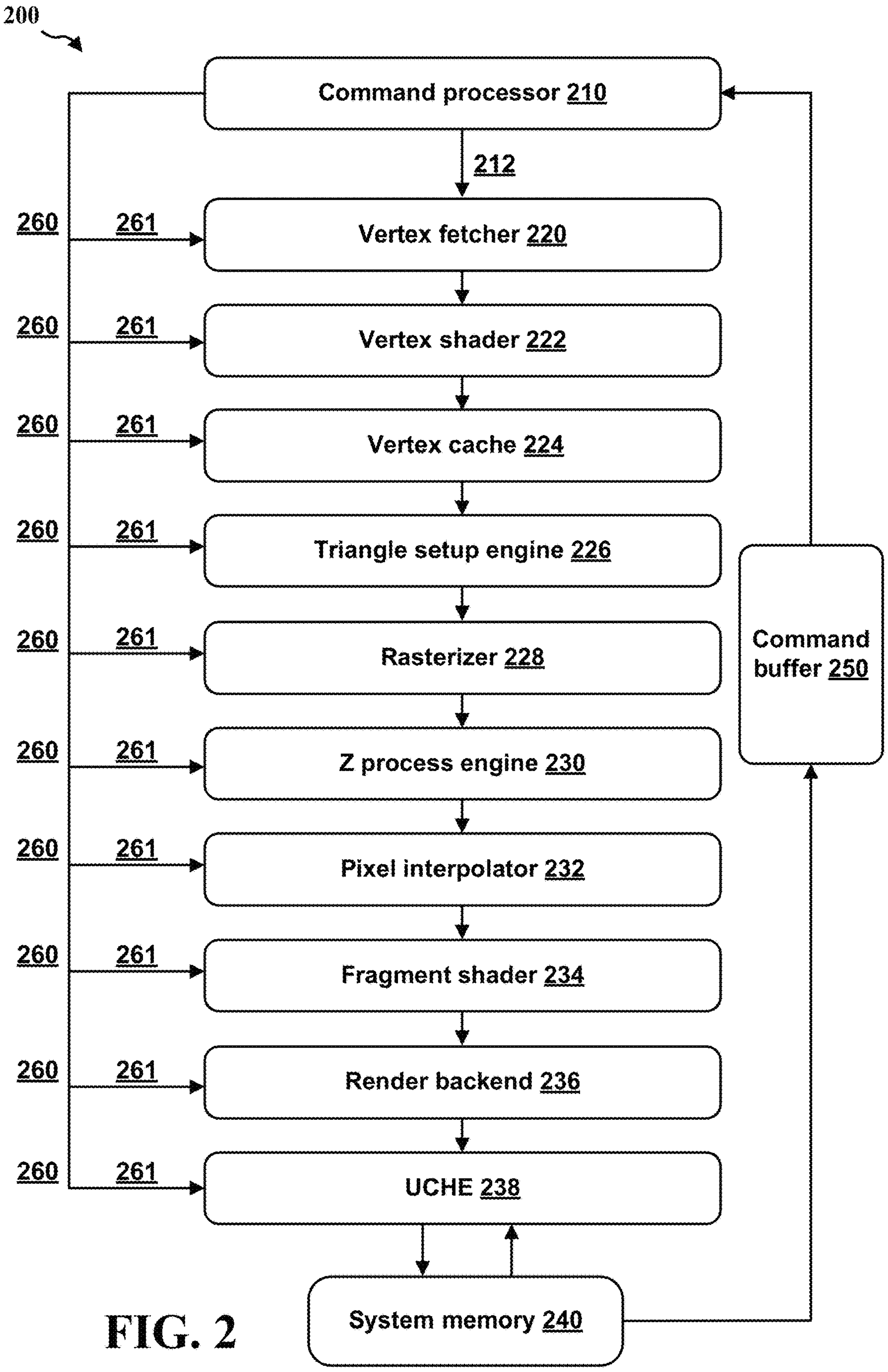
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call packets 212 through separate paths to the processing units or blocks in the GPU. Further, the command buffer 250 can alternate different states of context registers and draw calls. For example, a command buffer can simultaneously store the following information: context register of context N, draw call(s) of context N, context register of context N+1, and draw call(s) of context N+1.

GPUs can render images in a variety of different ways. In some instances, GPUs can render an image using direct rendering and/or tiled rendering. In tiled rendering GPUs, an image can be divided or separated into different sections or tiles. After the division of the image, each section or tile can be rendered separately. Tiled rendering GPUs can divide computer graphics images into a grid format, such that each portion of the grid, i.e., a tile, is separately rendered. In some aspects of tiled rendering, during a binning pass, an image can be divided into different bins or tiles. In some aspects, during the binning pass, a visibility stream can be constructed where visible primitives or draw calls can be identified. A rendering pass may be performed after the binning pass. In contrast to tiled rendering, direct rendering does not divide the frame into smaller bins or tiles. Rather, in direct rendering, the entire frame is rendered at a single time (i.e., without a binning pass). Additionally, some types of GPUs can allow for both tiled rendering and direct rendering (e.g., flex rendering).

In some aspects, GPUs can apply the drawing or rendering process to different bins or tiles. For instance, a GPU can render to one bin, and perform all the draws for the primitives or pixels in the bin. During the process of rendering to a bin, the render targets can be located in GPU internal memory (GMEM). In some instances, after rendering to one bin, the content of the render targets can be moved to a system memory and the GMEM can be freed for rendering the next bin. Additionally, a GPU can render to another bin, and perform the draws for the primitives or pixels in that bin. Therefore, in some aspects, there might be a small number of bins, e.g., four bins, that cover all of the draws in one surface. Further, GPUs can cycle through all of the draws in one bin, but perform the draws for the draw calls that are visible, i.e., draw calls that include visible geometry. In some aspects, a visibility stream can be generated, e.g., in a binning pass, to determine the visibility information of each primitive in an image or scene. For instance, this visibility stream can identify whether a certain primitive is visible or not. In some aspects, this information can be used to remove primitives that are not visible so that the non-visible primitives are not rendered, e.g., in the rendering pass. Also, at least some of the primitives that are identified as visible can be rendered in the rendering pass.

In some aspects of tiled rendering, there can be multiple processing phases or passes. For instance, the rendering can be performed in two passes, e.g., a binning, a visibility or bin-visibility pass and a rendering or bin-rendering pass. During a visibility pass, a GPU can input a rendering workload, record the positions of the primitives or triangles, and then determine which primitives or triangles fall into which bin or area. In some aspects of a visibility pass, GPUs can also identify or mark the visibility of each primitive or triangle in a visibility stream. During a rendering pass, a GPU can input the visibility stream and process one bin or area at a time. In some aspects, the visibility stream can be analyzed to determine which primitives, or vertices of primitives, are visible or not visible. As such, the primitives, or vertices of primitives, that are visible may be processed. By doing so, GPUs can reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information can be used to determine or generate a visibility stream. In a rendering pass, the primitives in each bin can be rendered separately. In these instances, the visibility stream can be fetched from memory and used to remove primitives which are not visible for that bin.

Some aspects of GPUs or GPU architectures can provide a number of different options for rendering, e.g., software rendering and hardware rendering. In software rendering, a driver or CPU can replicate an entire frame geometry by processing each view one time. Additionally, some different states may be changed depending on the view. As such, in software rendering, the software can replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware can manage the replication or processing of the primitives or triangles for each viewpoint in an image.

Figure 3:
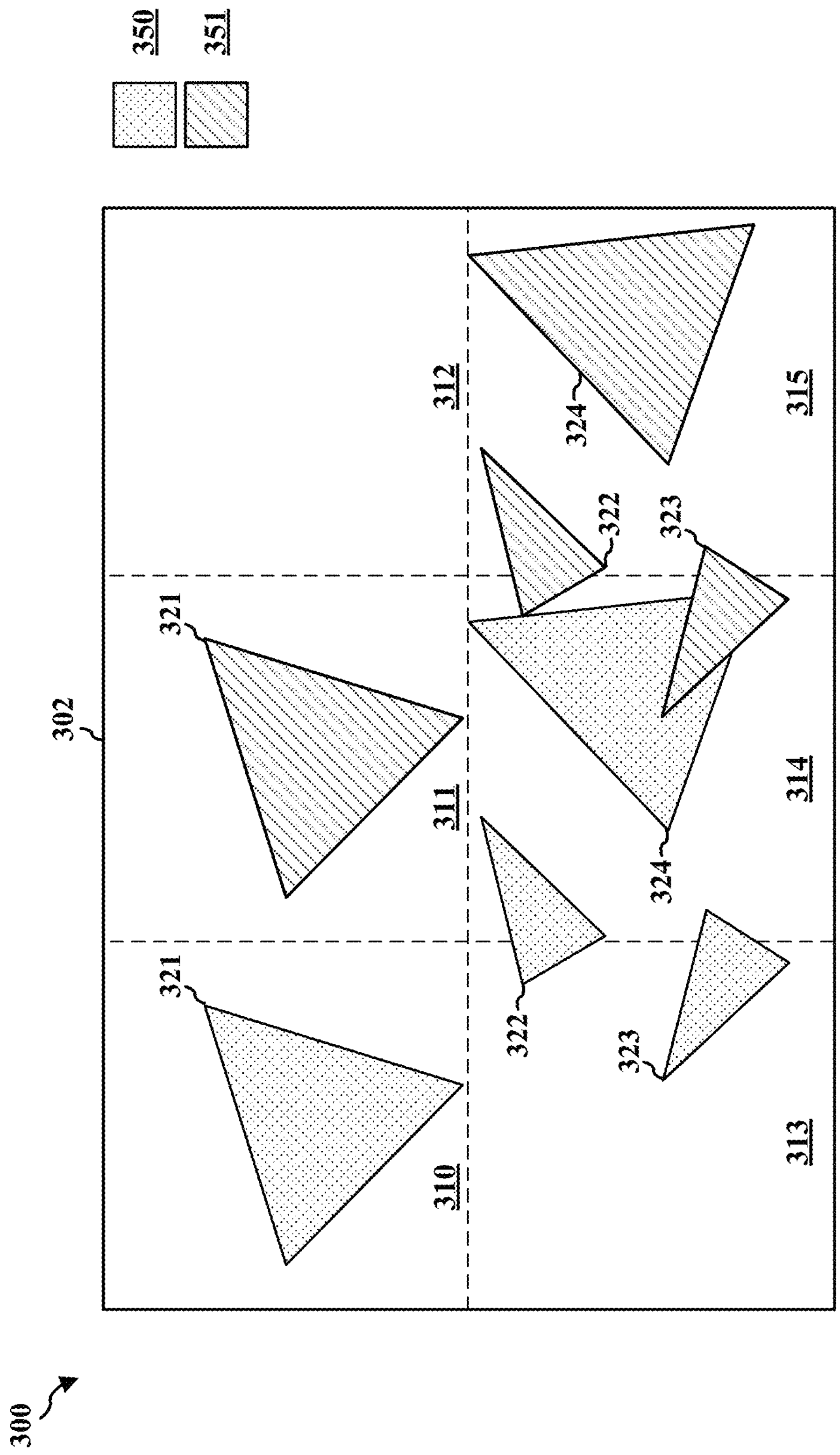
FIG. 3 illustrates an example image or surface in accordance with one or more techniques of this disclosure.

FIG. 3 illustrates image or surface 300, including multiple primitives divided into multiple bins in accordance with one or more techniques of this disclosure. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 can utilize multiple viewpoints or multi-view rendering.

As indicated herein, GPUs or graphics processors can use a tiled rendering architecture to reduce power consumption or save memory bandwidth. As further stated above, this rendering method can divide the scene into multiple bins, as well as include a visibility pass that identifies the triangles that are visible in each bin. Thus, in tiled rendering, a full screen can be divided into multiple bins or tiles. The scene can then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer can be a portion of memory or random access memory (RAM), e.g., containing a bitmap or storage, to help store display data for a GPU. The frame buffer can also be a memory buffer containing a complete frame of data. Additionally, the frame buffer can be a logic buffer. In some aspects, updating the frame buffer can be performed in bin or tile rendering, where, as discussed above, a surface is divided into multiple bins or tiles and then each bin or tile can be separately rendered. Further, in tiled rendering, the frame buffer can be partitioned into multiple bins or tiles.

As indicated herein, in some aspects, such as in bin or tiled rendering architecture, frame buffers can have data stored or written to them repeatedly, e.g., when rendering from different types of memory. This can be referred to as resolving and unresolving the frame buffer or system memory. For example, when storing or writing to one frame buffer and then switching to another frame buffer, the data or information on the frame buffer can be resolved from the GMEM at the GPU to the system memory, i.e., memory in the double data rate (DDR) RAM or dynamic RAM (DRAM).

In some aspects, the system memory can also be system-on-chip (SoC) memory or another chip-based memory to store data or information, e.g., on a device or smart phone. The system memory can also be physical data storage that is shared by the CPU and/or the GPU. In some aspects, the system memory can be a DRAM chip, e.g., on a device or smart phone. Accordingly, SoC memory can be a chip-based manner in which to store data.

In some aspects, the GMEM can be on-chip memory at the GPU, which can be implemented by static RAM (SRAM). Additionally, GMEM can be stored on a device, e.g., a smart phone. As indicated herein, data or information can be transferred between the system memory or DRAM and the GMEM, e.g., at a device. In some aspects, the system memory or DRAM can be at the CPU or GPU. Additionally, data can be stored at the DDR or DRAM. In some aspects, such as in bin or tiled rendering, a small portion of the memory can be stored at the GPU, e.g., at the GMEM. In some instances, storing data at the GMEM may utilize a larger processing workload and/or consume more power compared to storing data at the frame buffer or system memory.

Split rendering may refer to a rendering paradigm whereby a first portion of rendering tasks (or other tasks) for media content (e.g., XR media content) are performed by a remote device (i.e., a sending device) and a second portion of rendering tasks (or other tasks) for the media content are performed by a wearable display device (i.e., a receiver device). The final rendered content may be presented on a display of the wearable display device. In an example, the remote device may possess relatively greater computational capabilities than computational capabilities of the wearable display device. For instance, the remote device may have a greater amount of memory, a faster processor(s), etc. in comparison to memory and processor(s) of the wearable display device. In an example, the remote device may be a server, a video game console, a desktop computing device, or a mobile computing device such as a laptop computing device, a tablet computing device, or a smartphone. In an example, the remote device may be or include the device 104. In an example, the wearable display device may be XR glasses, an HMD, or a smartphone. In an example, the wearable display device may be or include the device 104. The remote device and the wearable display device may communicate over a wired connection and/or a wireless connection. In an example, the wired connection may be or include an Ethernet connection and/or a universal serial bus (USB) connection. In an example, the wireless connection may be or include a 5G New Radio (NR) connection, a Bluetooth™ (Bluetooth is a trademark of the Bluetooth Special Interest Group (SIG)) connection, and/or a wireless local area network (WLAN) connection, such as a Wi-Fi™ (Wi-Fi is a trademark of the Wi-Fi Alliance) connection based on the Institute of Electrical and Electronics Engineers (IEEE) 802.11 standard.

In an example, the wearable display device may transmit uplink data to the remote device, where the uplink data may include six degrees of freedom (6DOF) pose information (i.e., translation information and rotation information) of the wearable display device, and where the 6DOF pose information may be associated with a controller of the wearable display device. The remote device may receive the uplink data. The remote device may perform shading and geometry operations based on the uplink data. The remote device may transmit downlink data to the wearable display device, where the downlink data may include the encoded shading and geometry. In one aspect, the downlink data may be associated with 2.5-dimensional (2.5D) information, where the 2.5D information may include two-dimensional (2D) information and depth information. In another example, the downlink data may be associated with three-dimensional (3D) information. The wearable display device may receive the downlink data. The wearable display device may perform additional processing (e.g., a late stage reprojection) based on the downlink data and latest available pose information and the wearable display device may present media on a display panel based on the (processed) downlink data.

Figure 4:
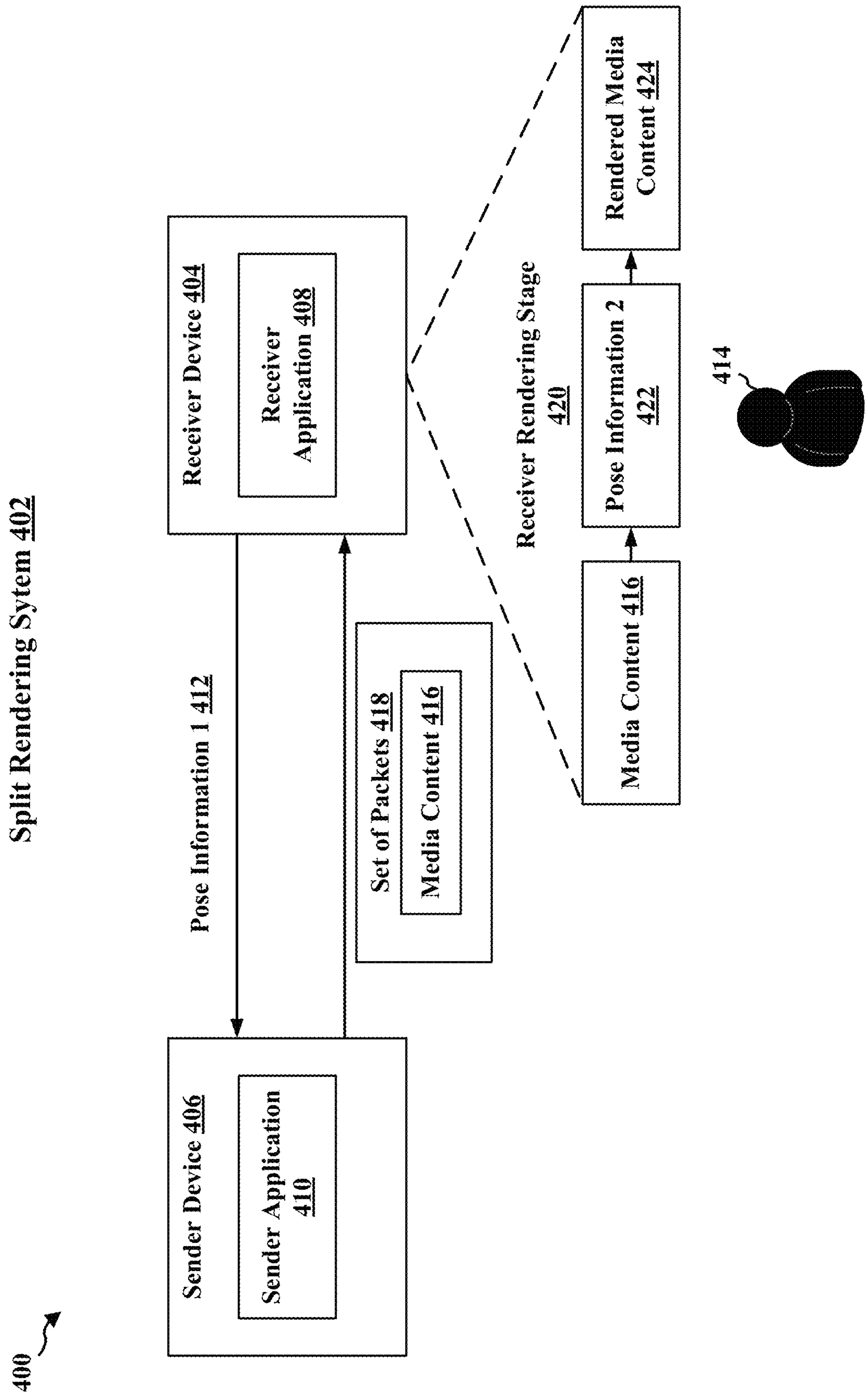
FIG. 4 is a diagram illustrating an example of a split rendering system in accordance with one or more techniques of this disclosure.

FIG. 4 is a diagram 400 illustrating an example of a split rendering system 402 in accordance with one or more techniques of this disclosure. The split rendering system 402 may include a receiver device 404 and a sender device 406. In an example, the receiver device 404 may be or include a wearable display device, such as an extended reality (XR) headset. In another example, the receiver device 404 may be or include a phone, tablet, a laptop, or a handheld device such as a handheld gaming console. In an example, the receiver device 404 may be or include the device 104. Although not illustrated in the diagram 400, it is understood that the receiver device 404 may include elements such as processor(s), memor(ies), data storage, an inertial measurement unit (IMU), communication device(s), display(s), input device(s), etc. In an example, the sender device 406 may be or include a phone, a tablet, a desktop computing device, a laptop computing device, a tablet, a gaming console, a server (e.g., a cloud server), etc. In an example, the sender device 406 may be or include the device 104. Although not illustrated in the diagram 400, it is understood that the sender device 406 may include elements such as processor(s), memor(ies), data storage, communication device(s), display (s), input device(s), etc.

The receiver device 404 and the sender device 406 may be in wired communication and/or wireless communication with one another. In one example, the receiver device 404 and the sender device 406 may be in wired communication with one another via an Ethernet connection and/or a universal serial bus (USB) connection. In another example, the receiver device 404 and the sender device 406 may be in wireless communication with one another via a 5G New Radio (NR) connection, a Bluetooth™ (Bluetooth is a trademark of the Bluetooth Special Interest Group (SIG)) connection, and/or a wireless local area network (WLAN) connection, such as a Wi-Fi™ (Wi-Fi is a trademark of the Wi-Fi Alliance) connection based on the Institute of Electrical and Electronics Engineers (IEEE) 802.11 standard.

In general, the sender device 406 may have relatively greater amounts of computational resources and battery life compared to computational resources and battery life of the receiver device 404. In one example, the sender device 406 and the receiver device 404 may include a first processor and a second processor, respectively. In such an example, the first processor may have a first clock rate, first cache size(s), and/or a first number of cores and the second processor may have a second clock rate, second cache size(s), and/or a second number of cores, where the first clock rate is greater than the second clock rate, the first cache size(s) are greater than the second cache size(s), and/or the first number of cores is greater than the second number of cores. In another example, the sender device 406 and the receiver device 404 may include a first amount of memory and a second amount of memory, respectively, where the first amount of memory is greater than the second amount of memory. In yet another example, the sender device 406 and the receiver device 404 may have a first battery life and a second battery life, respectively, where the first battery life is greater than the second battery life. In a further example, the sender device 406 may receive power via an alternating current (AC) socket, whereas the receiver device 404 may receive power via a battery.

The receiver device 404 may execute a receiver application 408 and the sender device 406 may execute a sender application 410. The receiver application 408 and the sender application 410 may collectively be a distributed application. In an example, the distributed application may be a video game application. In another example, the distributed application may be an XR application. In yet another example, the distributed application may be a multimedia application. In multimedia applications, there may be a rendering stage at the receiver device 404 based on latest available pose information and/or gesture information of the user at the receiver device 404 (explained in greater detail below).

In one example, the multimedia application may be a pixel streaming application. In a pixel streaming application, video content (or other media content) may be created by the sender device 406 and streamed for each eye of a user of the receiver device 404, that is, the video content may be streamed to a first display and a second display of the receiver device 404. In the pixel streaming application, audio content for each car of the user and/or haptic content for body part(s) of the user where haptic sensor(s) are located may be generalized and streamed to the receiver device 404. At a rendering stage at the receiver device 404, the receiver may adjust media content (e.g., video content, audio content, haptic content, etc.) based on a latest pose of the user. The receiver device 404 may present the adjusted media content to the user via an output device (e.g., display (s), speaker(s), vibration device(s), etc.). An output device may refer to a device that is configured to present information to a user that is experienced by the user via one or more senses of the user (e.g., sight, hearing, touch, etc.). The rendering stage may be or include a late stage reprojection (LSR), which may also be referred to as a last stage reprojection.

In another example, the multimedia application may be a vector streaming application. In a vector streaming application, the sender device 406 may transmit three-dimensional (3D) assets (e.g., a mesh), a scene graph, lighting information, and/or textures to the receiver device 404. During a rendering stage at the receiver device 404, the receiver device 404 may generate (i.e., produce) two-dimensional (2D) videos for each eye of the user 414, that is, the rendering stage may produce a first 2D video for a first display of the receiver device 404 and a second 2D video for a second display of the receiver device 404, where the first 2D video and the second 2D video may be presented concurrently or nearly concurrently on the first display and the second display, respectively.

In an example, the receiver device 404 may obtain first pose information 412 of a user 414 of the receiver device 404. For instance, the user 414 may wear the receiver device 404 over/on/around eye(s) or a head of the user 414, and the first pose information 412 may be or include a six degrees-of-freedom (6DOF) head pose of the user 414. In an example, the receiver device 404 may generate the first pose information 412 via an IMU of the receiver device 404.

The receiver device 404 may transmit, via the receiver application 408, the first pose information 412 to the sender device 406 via a wired connection and/or a wireless connection. The receiver device 404 may also transmit, via the receiver application 408, additional information to the sender device 406 concurrently with or substantially concurrently with the first pose information 412. In an example, the additional information may be or include state information (e.g., game state information) or gesture information of the user 414 as ascertained through controller(s) and/or camera(s) of the receiver device 404.

The sender device 406 may receive the first pose information 412. The sender device 406 may also receive the additional information. The sender device 406, via the sender application 410, may render media content 416 based on the first pose information 412. Media content may refer to information that is meant to be experienced by a user via one or more senses of the user (e.g., sight, hearing, touch, etc.). The sender device 406, via the sender application 410, may also render the media content 416 additionally based on the additional information.

The media content 416 may be or include video content, audio content, haptic content, and/or graphical content (e.g., a 3D mesh). Video content may refer to a set of video frames that may be displayed on display(s). A video frame (which may also be referred to as a frame) may refer to an image in a series of images that are to be presented sequentially to a user. Audio content may refer to a set of audio frames that may be played over speaker(s). Haptic content may refer to a set of haptic frames that may cause vibration device(s) to vibrate or cause actuators to move. A 3D mesh may refer to a collection of vertices, edges, and faces that define a shape of a polyhedral object.

The sender device 406 may packetize the media content 416 into a set of packets 418 and the sender device 406 may transmit the set of packets 418 to the receiver device 404 over the wired connection and/or the wireless connection. A packet may refer to a unit of data made into a package that travels along a network path. In one aspect, the sender device 406 may encode the set of packets 418 prior to or concurrently with transmitting the set of packets 418.

The receiver device 404 may receive the set of packets 418 from the sender device 406 over the wired connection and/or the wireless connection. The receiver device 404 may depacketize the set of packets 418 (e.g., assemble the set of packets 418) to obtain the media content 416. In one aspect, the receiver device 404 may decode the set of packets 418 prior to or concurrently with depacketizing the set of packets 418.

During a receiver rendering stage 420, the receiver device 404 may obtain second pose information 422 of the user 414 of the receiver device 404. The second pose information 422 of the user 414 may be a latest available 6DOF pose of the user 414. The receiver device 404 may perform additional rendering on the media content 416 based on the second pose information 422 in order to generate rendered media content 424. The additional rendering may account for a change in a pose of the user 414 between a time at which the first pose information 412 was transmitted and a time at which the set of packets 418 was received. The receiver device 404 may also perform the additional rendering further based on latest available gesture information of the user 414. The receiver device 404 may present the rendered media content 424 to the user 414. In an example, the receiver device 404 may display the rendered media content 424 to the user 414.

As described above, the sender device 406 may transmit the set of packets 418 to the receiver device 404. In one example, to allow for a maximum time for rendering at the receiver device 404 before a next display time instance, the sender device 406 may transmit each of the set of packets 418 back-to-back, which may be referred to as dense packet pacing. In another example, to facilitate rate control and congestion control at the sender device 406, the sender device 406 may transmit the set of packets 418 in an evenly spaced manner between two display time instances, which may be referred to as sparse packet pacing. Aspects pertaining to dense packet pacing and sparse packet pacing are further described below. Aspects presented herein pertain to balancing rendering time at the receiver device 404 with rate control and congestion control at the sender device 406.

Figure 5:
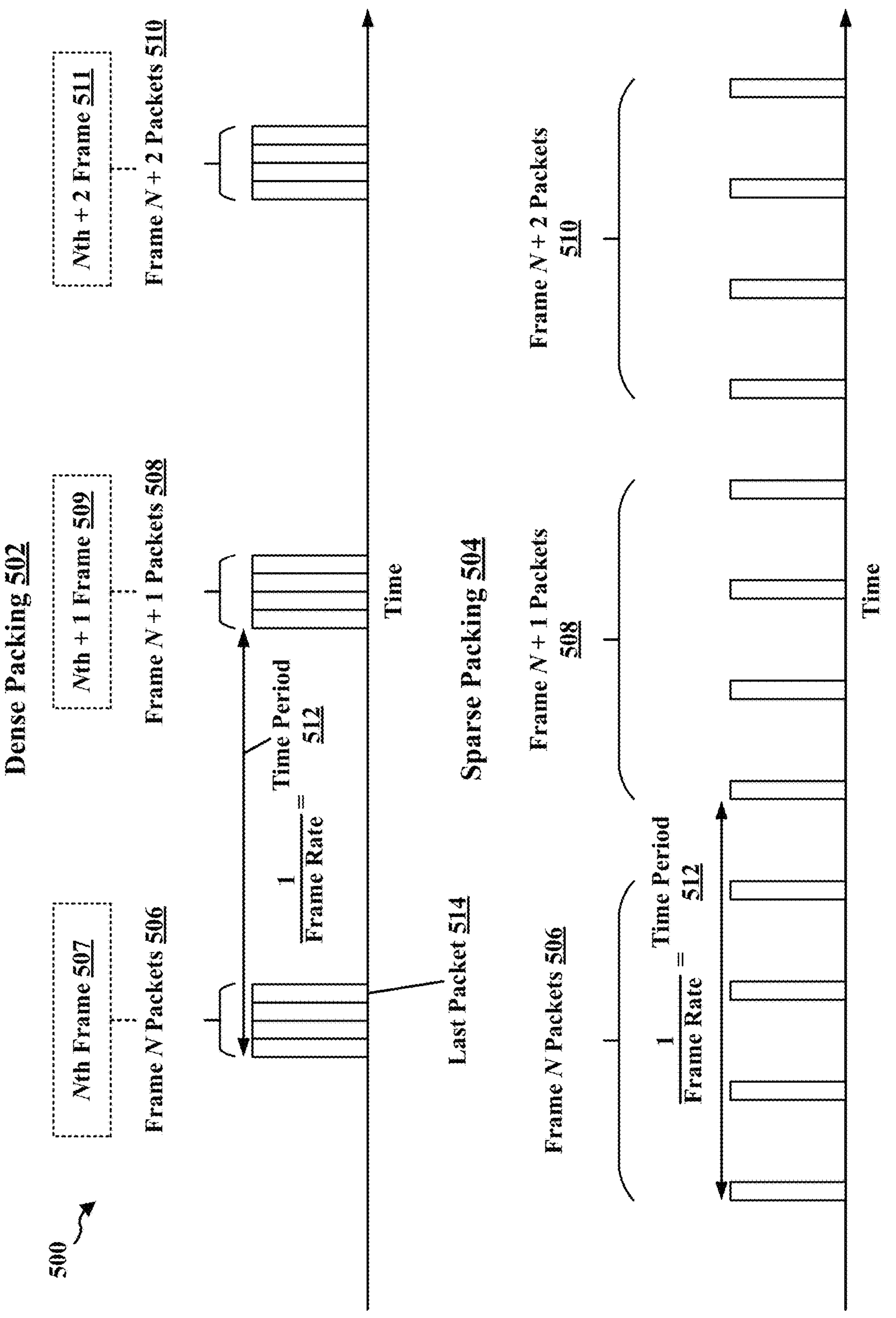
FIG. 5 is a diagram illustrating an example of dense packing and an example of sparse packing in accordance with one or more techniques of this disclosure.

FIG. 5 is a diagram 500 illustrating an example of dense packing 502 (i.e., dense packet pacing) and an example of sparse packing 504 (i.e., sparse packet pacing) in accordance with one or more techniques of this disclosure. Although the following description of the dense packing 502 and the sparse packing 504 may be focused on video frames, it is to be appreciated that concepts discussed with respect to the dense packing 502 and the sparse packing 504 may also apply to audio frames, haptic frames, and/or graphical content as well.

In the dense packing 502, the sender device 406 may transmit frame N packets 506 for an Nth frame 507, frame N+1 packets 508 for an Nth+1 frame 509, and frame N+2 packets 510 for an Nth+2 frame 511, where N is a non-negative integer. The Nth frame 507, the Nth+1 frame 509, and the Nth+2 frame 511 may be collectively referred to as "frames."

In an example, the receiver device 404 may be configured to present the frames on display(s) at a frame rate. A frame rate may refer to a number of frames displayed per second (FPS) on a display. As described above, the receiver device 404 may reproject media content (e.g., the Nth frame 507) based on latest available pose information during the receiver rendering stage 420. An amount of time that the receiver device 404 has to reproject the media content may be inversely proportional to the frame rate (e.g., time for reprojection $\propto$1/frame rate). For instance, when the frame rate is relatively high (e.g., 120 FPS), the receiver device 404 may have relatively less time to reproject the Nth frame 507, and when the frame rate is relatively low (e.g., 30 FPS), the receiver device 404 may have relatively more time to reproject the Nth frame 507.

In the dense packing 502, the frame N packets 506 may be densely packed with respect to a time period 512, where the time period 512 is equal to an inverse of the frame rate $$\left(\text{e.g., } \frac{1}{\text{Frame Rate}}\right).$$

With more particularity, each packet in the frame N packets 506 may be transmitted (and received) in a back-to-back manner such that there is no time (or a relatively small of amount of time) between the transmission (and the reception) of each packet in the frame N packets 506. In the dense packing 502, the frame N packets 506 may not be evenly distributed amongst the time period 512. For instance, the frame N packets 506 may be transmitted by the sender device 406 such that a last packet 514 in the frame N packets 506 arrives at the receiver device 404 relatively early during the time period 512 in order to provide the receiver device 404 with sufficient time to perform a reprojection on the Nth frame 507.

The dense packing 502 may be suitable for rendering at the receiver device 404 as the dense packing 502 may provide the receiver device 404 with a relatively long amount of time to perform a reprojection with respect to the Nth frame 507. However, the dense packing 502 may not be suitable for rate control and/or congestion control at the sender device 406 due to the "bursty" traffic nature of the dense packing 502.

In the sparse packing 504, the sender device 406 may transmit the frame N packets 506 for the Nth frame 507, the frame N+1 packets 508 for the Nth+1 frame 509, and the frame N+2 packets 510 for the Nth+2 frame 511; however, the frame N packets 506 may be sparsely packed with respect to a time period 512. With more particularity, each packet in the frame N packets 506 may be transmitted (and received) in a manner such that there is an amount of time (i.e., a relatively large amount of time) between the transmission (and the reception) of each packet in the frame N packets 506. In the sparse packing 504, the frame N packets 506 may be evenly distributed amongst the time period 512. For instance, the frame N packets 506 may be transmitted by the sender device 406 such that a last packet 514 in the frame N packets 506 arrives at the receiver device 404 relatively late during the time period 512 in order to facilitate rate control and/or congestion control at the sender device 406.

The sparse packing 504 may be suitable for rate control and/or congestion control, as each of the frame N+1 packets 508 may be sparsely distributed with respect to the time period 512. In one example, sparsely distributed may refer to (1) a time interval between each of a set of packets being equal, (2) a first packet in the set of packets is transmitted or received at a beginning of a time period defined by an inverse of a frame rate (i.e., 1/frame rate), and (3) a last packet in the set of packets is transmitted or a received at the end of the time period. In another example, sparsely distributed may refer to (1) a time interval between each of a set of packets being less than a first threshold and greater than a second threshold, where the first threshold is greater than the second threshold. However, the sparse packing 504 may not be suitable for rendering at the receiver device 404 due to the last packet 514 in the frame N packets 506 arriving relatively close to the end of the time period 512.

Figure 6:
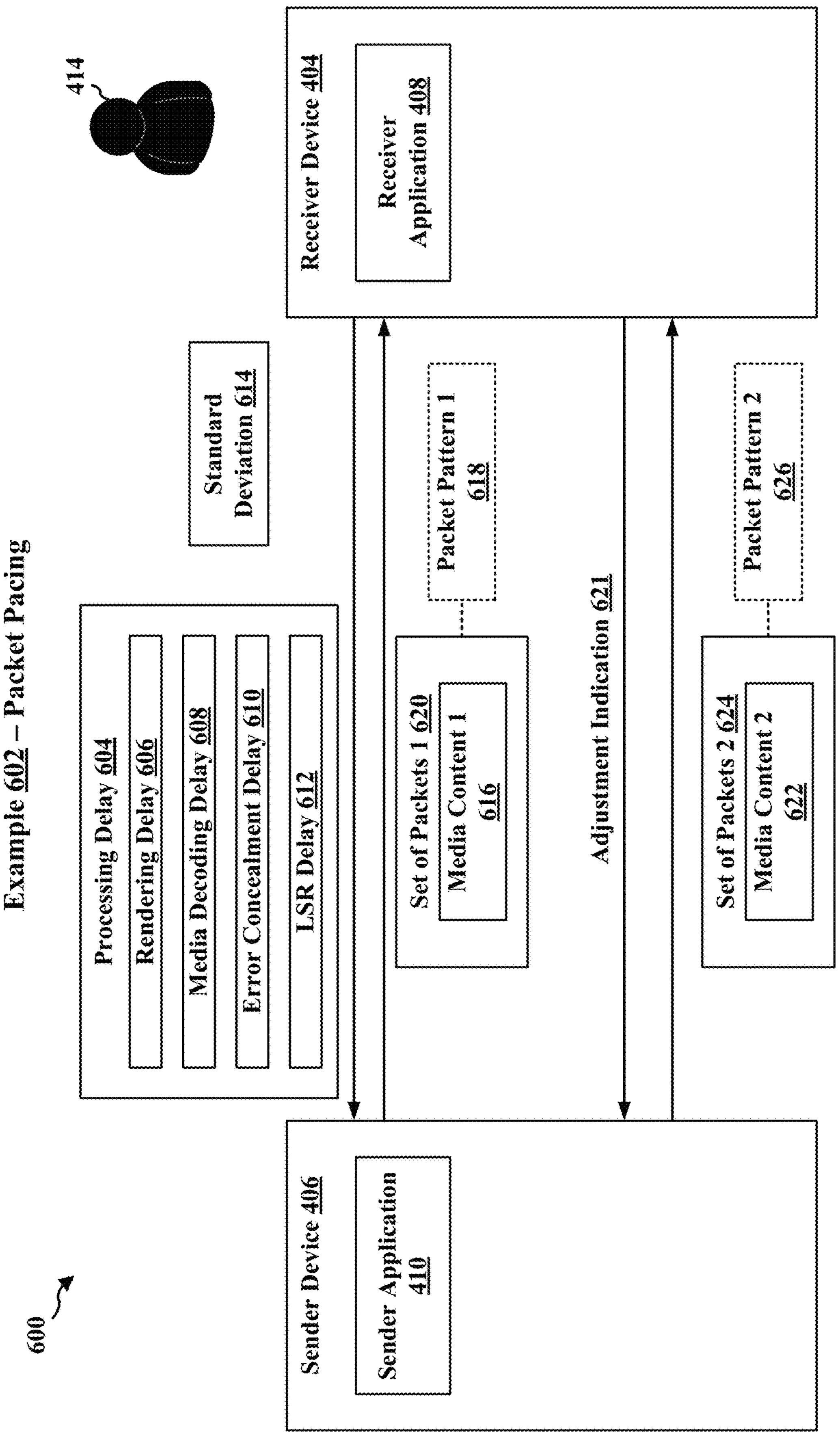
FIG. 6 is a diagram illustrating an example of packet pacing in accordance with one or more techniques of this disclosure.

FIG. 6 is a diagram 600 illustrating an example 602 of packet pacing in accordance with one or more techniques of this disclosure. In the example 602, the sender device 406 may "pace" transmissions of packets based on a delay at the receiver device 404.

In the example 602, the receiver device 404 may transmit an indication of a processing delay 604 to the sender device 406. In one aspect, the receiver device 404 may transmit the indication of the processing delay 604 to the sender device 406 via a session description protocol (SDP) during a multimedia session setup between the receiver device 404 and the sender device 406. SDP may refer to a protocol that exchanges messages between a first device and a second device for describing a multimedia communication session for the purposes of announcement and invitation (i.e., a multimedia session setup) and negotiating a configuration of multimedia codecs and other parameters. The receiver device 404 may also transmit the first pose information 412 to the sender device 406 as described above. The receiver device 404 may further transmit the additional information to the sender device 406 as described above in the description of FIG. 4.

The processing delay 604 (which may be denoted as "P") may refer to a delay (e.g., in milliseconds) between a first time at which a last packet of a frame (e.g., a video frame, an audio frame, a haptic frame, etc.) is received at the receiver device 404 and a second time at which the frame is presented on the receiver device 404. The processing delay 604 may be or include a rendering delay 606, a media decoding delay 608 (i.e., a video/audio decoding delay), an error concealment delay 610, and/or an LSR delay 612. The rendering delay 606 may refer to a delay associated with the receiver rendering stage 420. The media decoding delay 608 (which may also be referred to as a decoding delay) may refer to a delay associated with decoding encoded media content. The error concealment delay 610 may refer to a delay incurred when the receiver device 404 generates a frame for error concealment purposes. The LSR delay 612 may refer to a delay incurred as the receiver device 404 performs an LSR. In one aspect, the processing delay 604 may be signaled as a single value. For instance, the processing delay 604 may be a sum of two or more of the rendering delay 606, the media decoding delay 608, the error concealment delay 610, and/or the LSR delay 612. In another aspect, the processing delay 604 may be signaled component-wise. For instance, the processing delay 604 may include a first value corresponding to the rendering delay 606, a second values corresponding to the media decoding delay 608, a third value corresponding to the error concealment delay 610, and/or a fourth value corresponding to the LSR delay.

In one aspect, the processing delay 604 may be for multiple media types (e.g., video content, audio content, and haptic content). In such an aspect, the processing delay 604 may include processing delays for each of the multiple media types (e.g., a first processing delay for the video content, a second processing delay for the audio content, and a third processing delay for the haptic content), where each processing delay in the processing delays may include respective instances of a rendering delay, a media decoding delay, an error concealment delay, and/or an LSR delay with respect to a media type.

In one aspect, the processing delay 604 may be precomputed by the receiver device 404. In another aspect, the processing delay 604 may be computed by the receiver device 404 as the receiver device 404 executes the receiver application 408. In one aspect, the processing delay 604 may be an average processing delay for a set of frames that were previously processed and presented by the receiver device 404.

In one aspect, the receiver device 404 may compute a standard deviation 614 with respect to the processing delay 604. In one aspect, the receiver device 404 may compute a standard deviation 614 with respect to each of the rendering delay 606, the media decoding delay 608, the error concealment delay 610, and/or the LSR delay 612. A standard deviation may refer to a measure of how dispersed data is in relation to a mean of the data. The receiver device 404 may transmit an indication of the standard deviation to the sender device 406 (e.g., concurrently or nearly concurrently with transmitting the indication of the processing delay 604).

The sender device 406 may receive the indication of the processing delay 604 from the receiver device 404. The sender device 406 may also receive the indication of the standard deviation 614 from the receiver device 404. The sender device 406 may further receive the first pose information 412 from the receiver device 404. The sender device 406 may also receive the additional information as described above with respect to FIG. 4 from the receiver device 404.

The sender device 406 may render first media content 616 (e.g., video content, audio content, haptic content, and/or graphical content) based on the first pose information 412. The sender device 406 may also render the first media content 616 based on the additional information as described above with respect to FIG. 4.

The sender device 406 may utilize the processing delay 604 to determine a time interval during which packets for a next presentation time (i.e., a display time) are to be transmitted. In an example, the sender device 406 may determine a first packet pattern 618 (i.e., a first packet departure pattern, a first packet arrival pattern) for the first media content 616 based on the processing delay 604. In one aspect, the sender device 406 may additionally determine the first packet pattern 618 based on the standard deviation 614. The first packet pattern 618 may define (1) spacings (i.e., time intervals) between each of a first set of packets 620 for the first media content 616 and/or (2) a time gap (which may be denoted as "G") between a last transmitted packet in the first set of packets 620 and a first transmitted packet in a set of packets that is to be transmitted immediately after the first set of packets 620. In one aspect, the first packet pattern 618 may maximize the time gap so as to provide the receiver device 404 with time to perform a reprojection while also evenly spacing the first set of packets 620 within a time period corresponding to an inverse of a frame rate of the receiver device 404. Aspects pertaining to the spacings and the time gap are discussed in greater detail below.

In one aspect, the first media content 616 may include multiple media types (e.g., video content, audio content, and haptic content). In such an aspect, the sender device 406 may determine different packet patterns for each of the multiple media types based on processing delays for each of the respective media types or the sender device 406 may determine a single packet pattern for the multiple media types based on the processing delays for each of the respective media types.

The sender device 406 may packetize the first media content 616 into the first set of packets 620. The sender device 406 may transmit the first set of packets 620 to the receiver device 404 according to the first packet pattern 618 (i.e., a packet departure pattern). In one aspect, the sender device 406 may encode the first set of packets 620 prior to or concurrently with transmitting the first set of packets 620.

The receiver device 404 may receive the first set of packets 620 according to the first packet pattern 618 (i.e., a packet arrival pattern). The receiver device 404 may depacketize the first set of packets 620 (i.e., assemble the first set of packets 620) in order to obtain the first media content 616. In one aspect, the first set of packets 620 may be encoded, and the receiver device 404 may decode the first set of packets 620 prior to or concurrently with depacketizing the first set of packets 620.

The receiver device 404 may perform the receiver rendering stage 420 with respect to the first media content 616. In an example, the receiver device 404 may perform a reprojection (e.g., an LSR) on the first media content 616. The receiver device may present the (rendered) first media content 616 to the user 414 via an output device. In an example, the (rendered) first media content 616 may be the rendered media content 424. In one example in which the (rendered) first media content 616 is video content, the receiver device 404 may present the video content on display(s) (e.g., the display(s) 131) of the receiver device 404. In another example in which the (rendered) first media content 616 is audio content, the receiver device 404 may play the audio content over speaker(s) of the receiver device 404. In a further example in which the (rendered) first media content 616 is haptic content, the receiver device 404 may cause haptic device(s) of the receiver device 404 to vibrate based on the haptic content. In yet another example in which the (rendered) first media content 616 includes video content, audio content, and haptic content, the receiver device 404 may present the video content on the display(s), play the audio content over the speaker(s), and cause the haptic device(s) to vibrate based on the haptic content.

Figure 7:
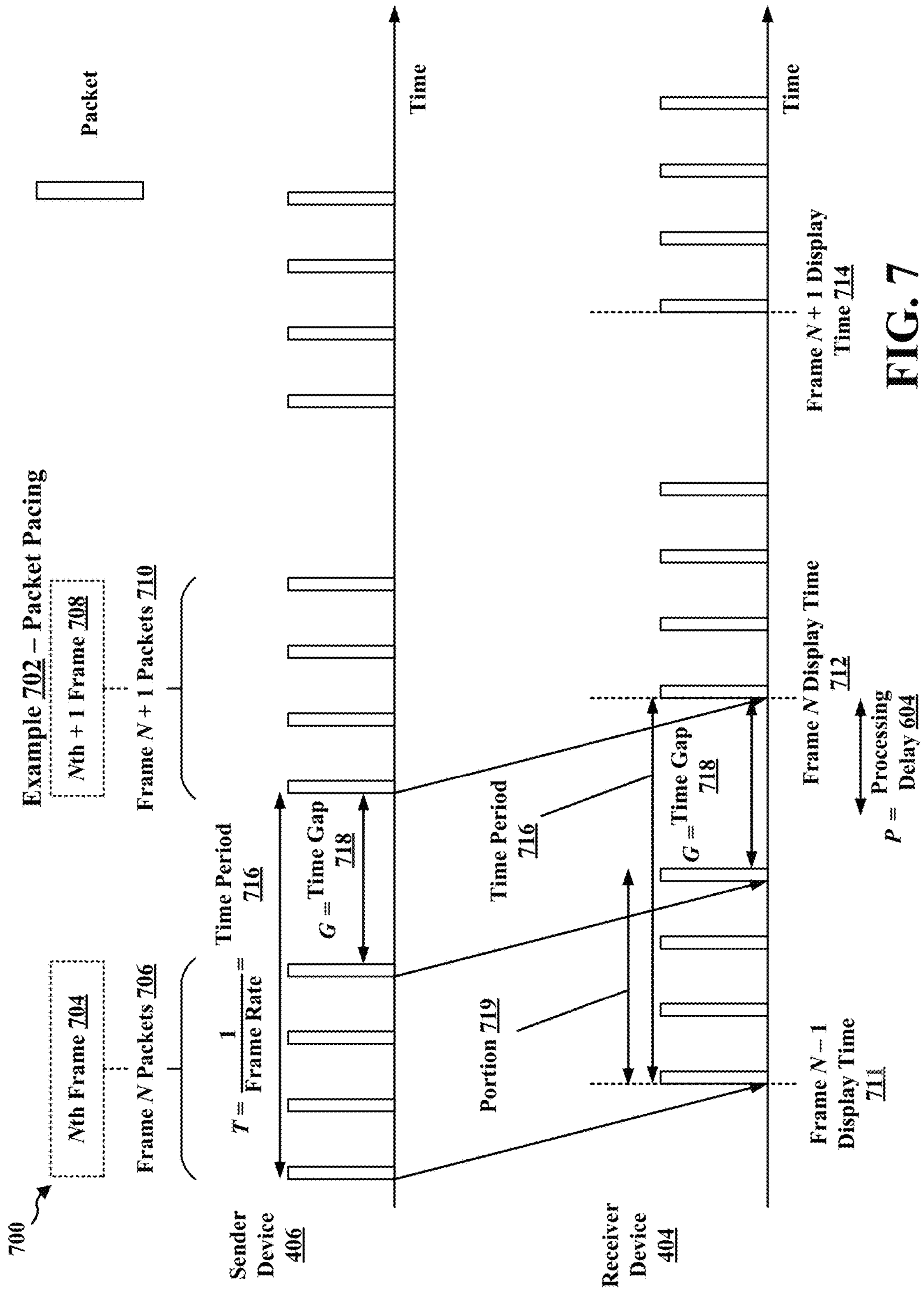
FIG. 7 is a diagram illustrating an example of packet pacing in accordance with one or more techniques of this disclosure.

FIG. 7 is a diagram 700 illustrating an example 702 of packet pacing in accordance with one or more techniques of this disclosure. The example 702 may correspond to the first packet pattern 618. The diagram 700 depicts an Nth frame 704, frame N packets 706 for the Nth frame 704, an Nth+1 frame 708, and frame N+1 packets 710 for the Nth+1 frame 708. The diagram 700 also depicts a frame N−1 display time 711 for an Nth−1 frame at the receiver device 404, a frame N display time 712 for the Nth frame 704 at the receiver device 404, and a frame N+1 display time 714 for the Nth+1 frame 708 at the receiver device 404.

In an example, the sender device 406 may render the Nth frame 704 in a manner similar to that described above with respect to FIG. 6. In an example, the Nth frame 704 may be or include the first media content 616. The sender device 406 may packetize the Nth frame 704 into the frame N packets 706.

A time period 716 ("T") may be associated with an inverse of a frame rate of the receiver device 404. The time period 716 may be defined as beginning at a time instance at which a first packet in the frame N packets 706 is transmitted and ending at a time instance at which a first packet in the frame N+1 packets 710 is transmitted. A time gap 718 may be defined as beginning at a time instance at which a last packet in the frame N packets 706 is transmitted and ending at a time instance at which the first packet in the frame N+1 packets 710 is transmitted.

The sender device 406 may transmit the frame N packets 706 and the frame N+1 packets 710 according to the first packet pattern 618. With more particularity, according to the first packet pattern 618, the sender device 406 may transmit the frame N packets 706 and the frame N+1 packets 710 such that (1) the time gap 718 is greater than the processing delay 604 (in order to provide the receiver device 404 with sufficient time to perform a reprojection on the Nth frame 704 and (2) the frame N packets 706 are evenly distributed in a portion 719 of the time period 716 (in order to facilitate rate control and/or congestion control at the sender device 406), where the portion 719 corresponds to a difference between the time period 716 and the time gap 718.

Referring back to FIG. 6, in one aspect, the receiver device 404 may signal the sender device 406 with an adjustment of the time gap 718 and/or packet spacing (referred to hereafter as "an adjustment indication 621") based on a comparison of the time gap 718 and the processing delay 604. In an example, the receiver device 404 may compare the time gap 718 and the processing delay 604. If the time gap 718 is less than the processing delay 604, the adjustment indication 621 may indicate that the time gap 718 is to be increased. If the time gap 718 is greater than the processing delay 604 by more than a threshold, the adjustment indication 621 may indicate that the time gap 718 is to be decreased.

The receiver device 404 may transmit the adjustment indication 621 to the sender device 406. In one aspect, the receiver device 404 may transmit the adjustment indication 621 via an SDP update. In another aspect, the receiver device 404 may transmit the adjustment indication 621 by "piggybacking" the adjustment indication 621 in a real-time transport protocol (RTP) header extension in a packet associated with a frame. RTP may refer to a network protocol for delivering audio and video over internet protocol (IP) networks. An RTP header extension may refer to a header extension associated with RTP.

The sender device 406 may receive the adjustment indication 621 from the receiver device 404. The sender device 406 may render second media content 622 in a manner similar to that described above with respect to the first media content 616. In an example, the first media content 616 and the second media content 622 may be part of a video stream, where the first media content 616 is prior to the second media content 622. The sender device may packetize the second media content 622 into a second set of packets 624 in a manner similar to that described above with respect to the first set of packets 620. The sender device 406 may determine a second packet pattern 626 (i.e., a packet departure pattern, a packet arrival pattern) based on the adjustment indication 621. For example, the sender device 406 may increase or decrease the time gap 718 based on the adjustment indication 621. The sender device 406 may transmit the second set of packets 624 according to the second packet pattern 626 (i.e., a packet departure pattern). The receiver device 404 may receive the second set of packets 624 according to the second packet pattern 626 (a packet arrival pattern). The receiver device 404 may depacketize the second set of packets to obtain the second media content 622, perform additional rendering (e.g., a reprojection) on the second media content 622, and present the (rendered) second media content 622 to the user 414 in a manner similar to that of the first media content 616.

Figure 8:
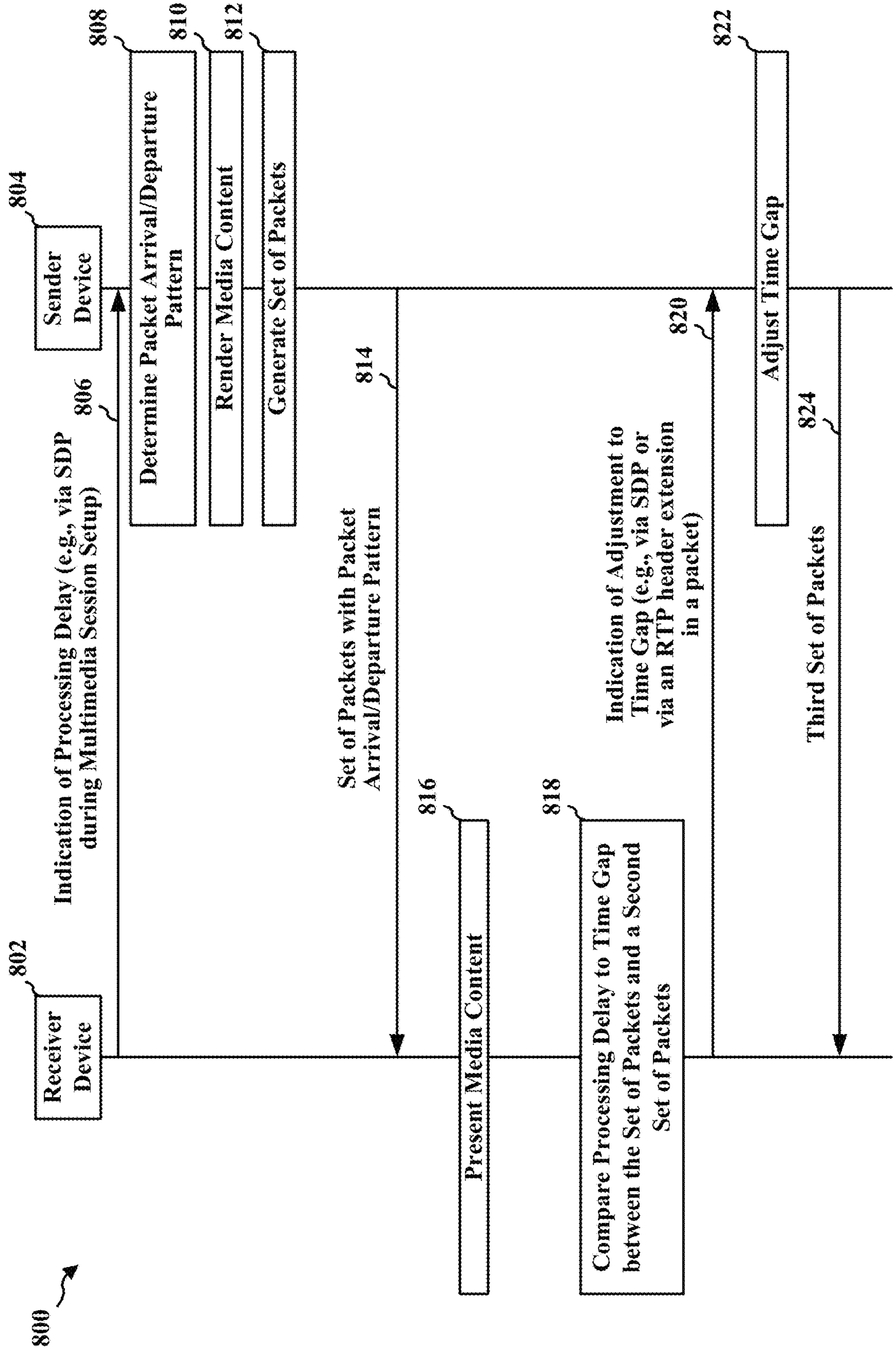
FIG. 8 is a call flow diagram illustrating example communications between a receiver device and a sender device in accordance with one or more techniques of this disclosure.

FIG. 8 is a call flow diagram 800 illustrating example communications between a receiver device 802 and a sender device 804 in accordance with one or more techniques of this disclosure. In an example, the receiver device 802 may be or include the device 104 or the receiver device 404. In an example, the sender device 804 may be or include the device 104 or the sender device 406.

At 806, the receiver device 802 may transmit, to a second device (i.e., the sender device 804), an indication of a processing delay associated with a set of packets associated with media content. At 814, the receiver device 802 may receive, from the second device (i.e., the sender device 804), the set of packets in a packet arrival pattern that is based on the processing delay. At 816, the receiver device 802 may present, based on the received set of packets, the media content via an output device.

In one aspect, at 818, the receiver device 802 may compare the processing delay to a time gap between the set of packets and a second set of packets associated with the media content. At 820, the receiver device 802 may transmit, to the second device (i.e., the sender device 804), a second indication of an adjustment to the time gap based on the comparison. At 824, the receiver device 802 may receive, from the second device (i.e., the sender device 804), a third set of packets based on the adjustment to the time gap.

At 806, the sender device 804 may receive, from a second device (i.e., the receiver device 802), an indication of a processing delay associated with a set of packets associated with media content. At 808, the sender device 804 may determine a packet departure pattern for the set of packets associated with the media content based on the indication of the processing delay. At 814, the sender device 804 may transmit, to the second device (i.e., the receiver device 802), the set of packets based on the packet departure pattern.

At 810, the sender device 804 may render the media content. At 812, the sender device 804 may generate the set of packets associated with the rendered media content, where transmitting the set of packets at 814 may include transmitting the generated set of packets. At 820, the sender device 804 may receive, from the second device (i.e., the receiver device 802), a second indication of an adjustment to a time gap between the set of packets and a second set of packets associated with the media content. At 822, the sender device 804 may adjust the time gap based on the second indication. At 824, the sender device 804 may transmit, to the second device (i.e., the receiver device 802), the second set of packets based on the adjusted time gap.

Figure 9:
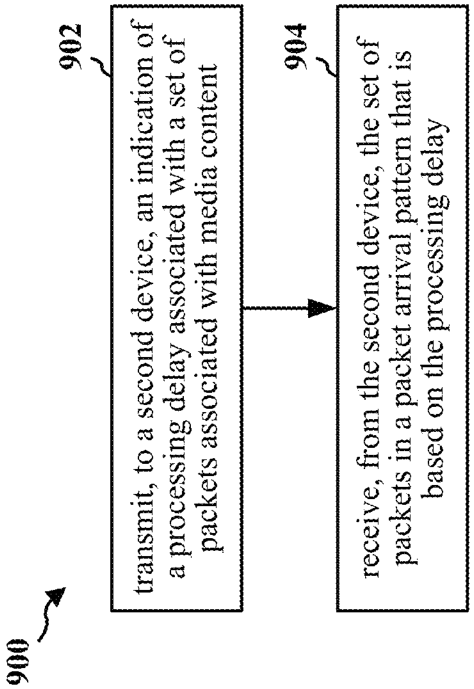
FIG. 9 is a flowchart of an example method of graphics processing in accordance with one or more techniques of this disclosure.

FIG. 9 is a flowchart 900 of an example method of graphics processing in accordance with one or more techniques of this disclosure. The method may be performed by an apparatus, such as an apparatus for graphics processing, a GPU, a CPU, the device 104, the receiver device 404, the receiver device 802, a wireless communication device, and the like, as used in connection with the aspects of FIGS. 1-8. The method may be associated with various advantages at a receiver device, such as balancing rendering time and rate/congestion control. In an example, the method may be performed by the packet pacer 198.

At 902, the apparatus (e.g., a first device, such as a receiver device) transmits, to a second device (e.g., a sender device), an indication of a processing delay associated with a set of packets associated with media content. For example, FIG. 8 at 806 shows that the receiver device 802 may transmit, to a second device (e.g., the sender device 804), an indication of a processing delay associated with a set of packets associated with media content. In an example, the set of packets may be or include the first set of packets 620. In an example, the indication of the processor delay may be the processing delay 604. In an example, the media content may be or include the first media content 616. In an example, 902 may be performed by the packet pacer 198.

At 904, the apparatus receives, from the second device, the set of packets in a packet arrival pattern that is based on the processing delay. For example, FIG. 8 at 814 shows that the receiver device 802 may receive, from the second device (e.g., the sender device 804), the set of packets in a packet arrival pattern that is based on the processing delay. For example, the packet arrival pattern may be or include the first packet pattern 618. In an example, the packet arrival pattern may be associated with the example 702. In another example, the packet arrival pattern may be associated with the dense packing 502, the sparse packing 504, or an intermediate packing between the dense packing 502 and the sparse packing 504. In an example, 904 may be performed by the packet pacer 198.

Figure 10:
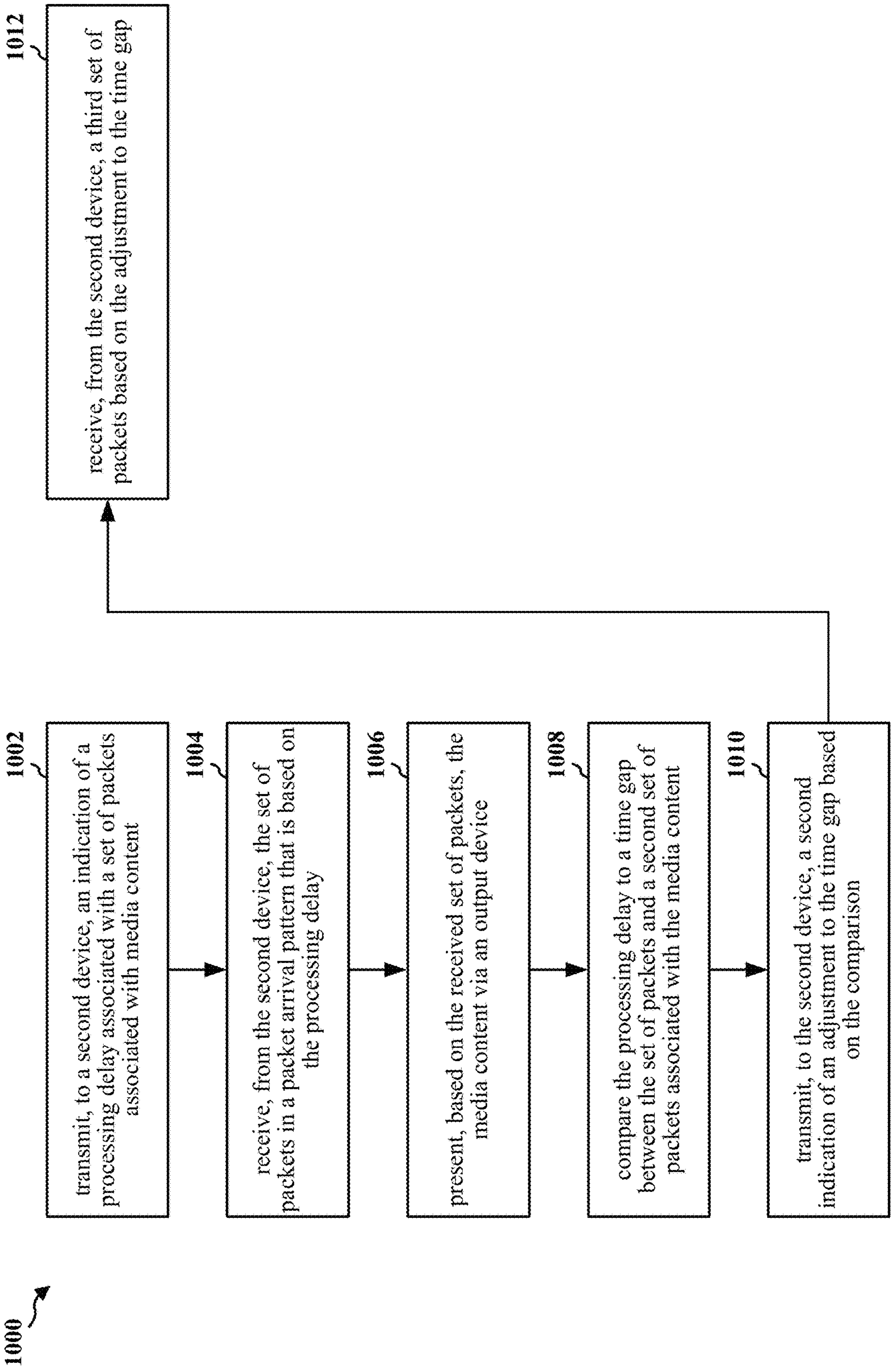
FIG. 10 is a flowchart of an example method of graphics processing in accordance with one or more techniques of this disclosure.

FIG. 10 is a flowchart 1000 of an example method of graphics processing in accordance with one or more techniques of this disclosure. The method may be performed by an apparatus, such as an apparatus for graphics processing, a GPU, a CPU, the device 104, the receiver device 404, the receiver device 802, a wireless communication device, and the like, as used in connection with the aspects of FIGS. 1-8. The method may be associated with various advantages at a receiver device, such as balancing rendering time and rate/congestion control. In an example, the method (including the various aspects detailed below) may be performed by the packet pacer 198.

At 1002, the apparatus (e.g., a first device, such as a receiver device) transmits, to a second device (e.g., a sender device), an indication of a processing delay associated with a set of packets associated with media content. For example, FIG. 8 at 806 shows that the receiver device 802 may transmit, to a second device (e.g., the sender device 804), an indication of a processing delay associated with a set of packets associated with media content. In an example, the set of packets may be or include the first set of packets 620. In an example, the indication of the processor delay may be the processing delay 604. In an example, the media content may be or include the first media content 616. In an example, 1002 may be performed by the packet pacer 198.

At 1004, the apparatus receives, from the second device, the set of packets in a packet arrival pattern that is based on the processing delay. For example, FIG. 8 at 814 shows that the receiver device 802 may receive, from the second device (e.g., the sender device 804), the set of packets in a packet arrival pattern that is based on the processing delay. For example, the packet arrival pattern may be or include the first packet pattern 618. In an example, the packet arrival pattern may be associated with the example 702. In another example, the packet arrival pattern may be associated with the dense packing 502, the sparse packing 504, or an intermediate packing between the dense packing 502 and the sparse packing 504. In an example, 1004 may be performed by the packet pacer 198.

In one aspect, the media content may include at least one of audio content, video content, haptic content, or graphical content. For example, the media content may be or include the first media content 616, and the first media content 616 may be or include of audio content, video content, haptic content, and/or graphical content.

In one aspect, the set of packets may be associated with a pixel streaming application or a vector streaming application. For example, the set of packets 620 may be associated with a pixel streaming application or a vector streaming application.

In one aspect, the indication of the processing delay may include at least one of a rendering delay, a decoding delay, an error concealment delay, or a late stage reprojection (LSR) delay. For example, the indication of the processing delay may include at least one of the rendering delay 606, the media decoding delay 608, the error concealment delay 610, or the LSR delay 612.

In one aspect, the indication of the processing delay may further include at least one of a sum or a standard deviation of at least one of the rendering delay, the decoding delay, the error concealment delay, or the LSR delay. For example, the indication of the processing delay may be a sum of at least two of the rendering delay 606, the media decoding delay 608, the error concealment delay 610, or the LSR delay 612. For example, the indication of the processing delay may include the standard deviation 614.

In one aspect, the packet arrival pattern may correspond to a time interval that occurs between each packet in the set of packets. For example, the first packet pattern 618 may correspond to a time interval that occurs between each packet in the set of packets. In an example, the aforementioned aspect may correspond to the example 702.

In one aspect, transmitting the indication of the processing delay associated with the set of packets may include transmitting the indication of the processing delay via a session description protocol (SDP) during a multimedia session setup with the second device. For example, FIG. 8 at 806 shows that transmitting the indication of the processing delay associated with the set of packets may include transmitting the indication of the processing delay via a session description protocol (SDP) during a multimedia session setup with the second device (e.g., the sender device 804).

In one aspect, at 1006, the apparatus may present, based on the received set of packets, the media content via an output device. For example, FIG. 8 at 816 shows that the receiver device 802 may present, based on the received set of packets, the media content via an output device. In an example, the output device may be or include the display(s)

131, a speaker(s), and/or haptic device(s). In an example, 1006 may be performed by the packet pacer 198.

In one aspect, presenting the media content via the output device may include: transmitting the media content to the output device; or displaying the media content on the output device. For example, presenting the media content via the output device at 816 may include: transmitting the media content to the output device; or displaying the media content on the output device.

In one aspect, the set of packets may correspond to a frame of video content, where the frame may be associated with a display time duration, and where the packet arrival pattern may be associated with each packet in the set of packets being evenly distributed throughout the display time duration. For example, the frame of the video content may be or include the Nth frame 704 and the display time duration may include the frame N display time 712. In another example, the set of packets may be or include the frame N packets 506, the frame may be or include the Nth frame 507, the display time duration may correspond to the time period 512, and each packet in the set of packets being evenly distributed throughout the display time duration may correspond to the sparse packing 504. A display time duration may refer to a time period defined by an inverse of a frame rate.

In one aspect, the set of packets may correspond to a frame of video content, where the frame may be associated with a display time duration, and where the packet arrival pattern may be associated with each packet in the set of packets being unevenly distributed throughout the display time duration. For example, the frame of the video content may be or include the Nth frame 704 and the display time duration may include the frame N display time 712. In another example, the set of packets may be or include the frame N packets 506, the frame may be or include the Nth frame 507, the display time duration may correspond to the time period 512, and each packet in the set of packets being unevenly distributed throughout the display time duration may correspond to the dense packing 502.

In one aspect, at 1008, the apparatus may compare the processing delay to a time gap between the set of packets and a second set of packets associated with the media content. For example, FIG. 8 at 818 shows that the receiver device 802 may compare the processing delay to a time gap between the set of packets and a second set of packets associated with the media content. In an example, the set of packets may be or include the frame N packets 706 and the second set of packets may be the frame N+1 packets 710. In an example, the time gap may be the time gap 718. In an example, 1008 may be performed by the packet pacer 198.

In one aspect, at 1010, the apparatus may transmit, to the second device, a second indication of an adjustment to the time gap based on the comparison. For example, FIG. 8 at 820 shows that the receiver device 802 may transmit, to the second device (e.g., the sender device 804), a second indication of an adjustment to the time gap based on the comparison. In an example, the second indication of the adjustment to the time gap may be the adjustment indication 621. In an example, 1010 may be performed by the packet pacer 198.

In one aspect, at 1012, the apparatus may receive, from the second device, a third set of packets based on the adjustment to the time gap. For example, FIG. 8 at 824 shows that the receiver device 802 may receive, from the second device (e.g., the sender device 804, a third set of packets based on the adjustment to the time gap. In an example, 1012 may be performed by the packet pacer 198.

In one aspect, the comparison may indicate that the time gap is less than the processing delay, and the second indication of the adjustment to the time gap may indicate that the time gap is to be increased. For example, the comparison at 818 may indicate that the time gap is less than the processing delay, and the second indication of the adjustment to the time gap at 820 may indicate that the time gap is to be increased.

In one aspect, the comparison may indicate that the time gap is greater than the processing delay by a threshold, and the second indication of the adjustment to the time gap may indicate that the time gap is to be decreased. For example, the comparison at 818 may indicate that the time gap is greater than the processing delay by a threshold, and the second indication of the adjustment to the time gap at 820 may indicate that the time gap is to be decreased. The threshold may serve as a hysteresis to prevent ping pong behavior. In an example, if the time is gap is greater than the processing delay, but not greater than the threshold, the apparatus may not transmit the second indication.

In one aspect, transmitting the second indication of the adjustment to the time gap may include transmitting the second indication of the adjustment to the time gap (1) via a session description protocol (SDP) or (2) via a real-time transport protocol (RTP) header extension in a packet. For example, transmitting the second indication of the adjustment to the time gap at 820 may include transmitting the second indication of the adjustment to the time gap (1) via a session description protocol (SDP) or (2) via a real-time transport protocol (RTP) header extension in a packet.

Figure 11:
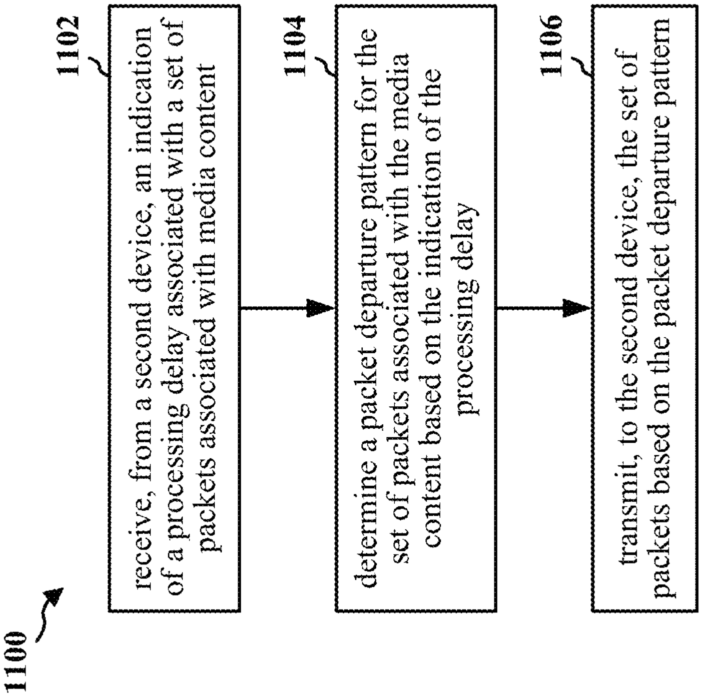
FIG. 11 is a flowchart of an example method of graphics processing in accordance with one or more techniques of this disclosure.

FIG. 11 is a flowchart 1100 of an example method of graphics processing in accordance with one or more techniques of this disclosure. The method may be performed by an apparatus, such as an apparatus for graphics processing, a GPU, a CPU, the device 104, the sender device 406, the sender device 804, a wireless communication device, and the like, as used in connection with the aspects of FIGS. 1-8. The method may be associated with various advantages at a sender device, such as balancing rendering time and rate/congestion control. In an example, the method may be performed by the packet pacer 199.

At 1102, the apparatus (e.g., a first device, such as a sender device) receives, from a second device, an indication of a processing delay associated with a set of packets associated with media content. For example, FIG. 8 at 806 shows that the sender device 804 may receive, from a second device (e.g., the receiver device 802), an indication of a processing delay associated with a set of packets associated with media content. In an example, the set of packets may be or include the first set of packets 620. In an example, the indication of the processor delay may be the processing delay 604. In an example, the media content may be or include the first media content 616. In an example, 1102 may be performed by the packet pacer 199.

At 1104, the apparatus determines a packet departure pattern for the set of packets associated with the media content based on the indication of the processing delay. For example, FIG. 8 at 808 shows that the sender device 804 may determines a packet departure pattern for the set of packets associated with the media content based on the indication of the processing delay. For example, the packet departure pattern may correspond to the first packet pattern 618. In an example, the packet departure pattern may be associated with the example 702. In another example, the packet departure pattern may be associated with the dense packing 502, the sparse packing 504, or an intermediate packing between the dense packing 502 and the sparse packing 504. In an example, 1104 may be performed by the packet pacer 199.

At 1106, the apparatus transmits, to the second device, the set of packets based on the packet departure pattern. For example, FIG. 8 at 814 shows that the sender device 804 may transmit, to the second device (e.g., the receiver device 802), the set of packets based on the packet departure pattern. In an example, 1106 may be performed by the packet pacer 199.

Figure 12:
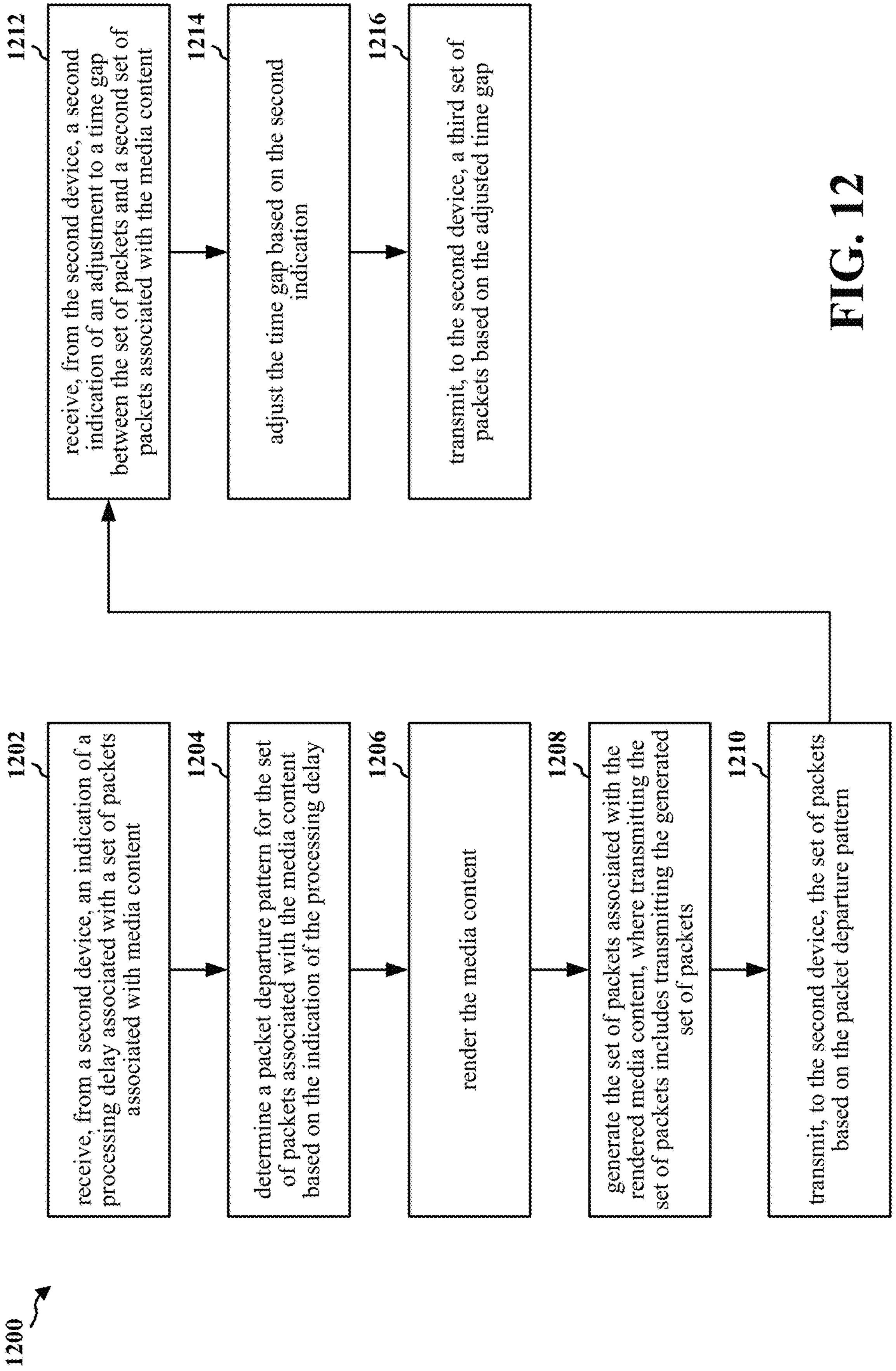
FIG. 12 is a flowchart of an example method of graphics processing in accordance with one or more techniques of this disclosure.

FIG. 12 is a flowchart 1200 of an example method of graphics processing in accordance with one or more techniques of this disclosure. The method may be performed by an apparatus, such as an apparatus for graphics processing, a GPU, a CPU, the device 104, the sender device 406, the sender device 804, a wireless communication device, and the like, as used in connection with the aspects of FIGS. 1-8. The method may be associated with various advantages at a sender device, such as balancing rendering time and rate/congestion control. In an example, the method (including the various aspects detailed below) may be performed by the packet pacer 199.

At 1202, the apparatus (e.g., a first device, such as a sender device) receives, from a second device, an indication of a processing delay associated with a set of packets associated with media content. For example, FIG. 8 at 806 shows that the sender device 804 may receive, from a second device (e.g., the receiver device 802), an indication of a processing delay associated with a set of packets associated with media content. In an example, the set of packets may be or include the first set of packets 620. In an example, the indication of the processor delay may be the processing delay 604. In an example, the media content may be or include the first media content 616. In an example, 1202 may be performed by the packet pacer 199.

At 1204, the apparatus determines a packet departure pattern for the set of packets associated with the media content based on the indication of the processing delay. For example, FIG. 8 at 808 shows that the sender device 804 may determines a packet departure pattern for the set of packets associated with the media content based on the indication of the processing delay. For example, the packet departure pattern may correspond to the first packet pattern 618. In an example, the packet departure pattern may be associated with the example 702. In another example, the packet departure pattern may be associated with the dense packing 502, the sparse packing 504, or an intermediate packing between the dense packing 502 and the sparse packing 504. In an example, 1204 may be performed by the packet pacer 199.

At 1210, the apparatus transmits, to the second device, the set of packets based on the packet departure pattern. For example, FIG. 8 at 814 shows that the sender device 804 may transmit, to the second device (e.g., the receiver device 802), the set of packets based on the packet departure pattern. In an example, 1210 may be performed by the packet pacer 199.

In one aspect, the media content may include at least one of audio content, video content, haptic content, or graphical content. For example, the media content may be or include the first media content 616, and the first media content 616 may be or include of audio content, video content, haptic content, and/or graphical content.

In one aspect, the set of packets may be associated with a pixel streaming application or a vector streaming application. For example, the set of packets 620 may be associated with a pixel streaming application or a vector streaming application.

In one aspect, the indication of the processing delay may include at least one of a rendering delay, a decoding delay, an error concealment delay, or a late stage reprojection (LSR) delay. For example, the indication of the processing delay may include at least one of the rendering delay 606, the media decoding delay 608, the error concealment delay 610, or the LSR delay 612.

In one aspect, the indication of the processing delay may further include at least one of a sum or a standard deviation of at least one of the rendering delay, the decoding delay, the error concealment delay, or the LSR delay. For example, the indication of the processing delay may be a sum of at least two of the rendering delay 606, the media decoding delay 608, the error concealment delay 610, or the LSR delay 612. For example, the indication of the processing delay may include the standard deviation 614.

In one aspect, the packet departure pattern may correspond to a time interval that occurs between each packet in the set of packets. For example, the packet departure pattern may correspond to the first packet pattern 618, where the first packet pattern 618 may correspond to a time interval that occurs between each packet in the set of packets. In an example, the aforementioned aspect may correspond to the example 702.

In one aspect, receiving the indication of the processing delay associated with the set of packets may include receiving the indication of the processing delay via a session description protocol (SDP) during a multimedia session setup with the second device. For example, FIG. 8 at 806 shows that receive the indication of the processing delay associated with the set of packets may include receiving the indication of the processing delay via a session description protocol (SDP) during a multimedia session setup with the second device (e.g., the receiver device 802).

In one aspect, at 1206, the apparatus may render the media content. For example, FIG. 8 at 810 shows that the sender device 804 may render the media content. In an example, 1206 may be performed by the packet pacer 199.

In one aspect, at 1208, the apparatus may generate the set of packets associated with the rendered media content, and transmitting the set of packets may include transmitting the generated set of packets. For example, FIG. 8 at 812 shows that the sender device 804 may generate the set of packets associated with the rendered media content, and transmitting the set of packets at 814 may include transmitting the generated set of packets. In an example, 1208 may be performed by the packet pacer 199.

In one aspect, the set of packets may correspond to a frame of video content, where the frame may be associated with a display time duration, and where the packet departure pattern may be associated with each packet in the set of packets being evenly distributed throughout the display time duration. For example, the frame of the video content may be or include the Nth frame 704 and the display time duration may be or include the frame N display time 712. In another example, the set of packets may be or include the frame N packets 506, the frame may be or include the Nth frame 507, the display time duration may correspond to the time period 512, and each packet in the set of packets being evenly distributed throughout the display time duration may correspond to the sparse packing 504.

In one aspect, the set of packets may correspond to a frame of video content, where the frame may be associated with a display time duration, and where the packet departure pattern may be associated with each packet in the set of packets being unevenly distributed throughout the display time duration. For example, the frame of the video content may be or include the Nth frame 704 and the display time duration may be or include the frame N display time 712. In another example, the set of packets may be or include the frame N packets 506, the frame may be or include the Nth frame 507, the display time duration may correspond to the time period 512, and each packet in the set of packets being unevenly distributed throughout the display time duration may correspond to the dense packing 502.

In one aspect, at 1212, the apparatus may receive, from the second device, a second indication of an adjustment to a time gap between the set of packets and a second set of packets associated with the media content. For example, FIG. 8 at 820 shows that the sender device 804 may receive, from the second device (e.g., the receiver device 802), a second indication of an adjustment to a time gap between the set of packets and a second set of packets associated with the media content. In an example, the second indication of the adjustment to the time gap may be the adjustment indication 621. In an example, 1212 may be performed by the packet pacer 199.

In one aspect, at 1214, the apparatus may adjust the time gap based on the second indication. For example, FIG. 8 at 822 shows that the sender device 804 may adjust the time gap based on the second indication. For instance, the sender device 804 may increase or decrease the time gap based on the second indication. In an example, 1214 may be performed by the packet pacer 199.

In one aspect, at 1216, the apparatus may transmit, to the second device, a third set of packets based on the adjusted time gap. For example, FIG. 8 at 824 shows that the sender device 804 may transmit, to the second device (e.g., the receiver device 802), a third set of packets based on the adjusted time gap. In an example, 1216 may be performed by the packet pacer 199.

In one aspect, receiving the second indication of the adjustment to the time gap may include receiving the second indication of the adjustment to the time gap (1) via a session description protocol (SDP) or (2) via a real-time transport protocol (RTP) header extension in a packet. For example, receiving the second indication of the adjustment to the time gap at 820 may include receiving the second indication of the adjustment to the time gap (1) via a session description protocol (SDP) or (2) via a real-time transport protocol (RTP) header extension in a packet.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for transmitting, to a second device, an indication of a processing delay associated with a set of packets associated with media content. The apparatus may further include means for receiving, from the second device, the set of packets in a packet arrival pattern that is based on the processing delay. The apparatus may further include means for presenting, based on the received set of packets, the media content via an output device. The apparatus may further include means for comparing the processing delay to a time gap between the set of packets and a second set of packets associated with the media content. The apparatus may further include means for transmitting, to the second device, a second indication of an adjustment to the time gap based on the comparison. The apparatus may further include means for receiving, from the second device, a third set of packets based on the adjustment to the time gap.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for receiving, from a second device, an indication of a processing delay associated with a set of packets associated with media content. The apparatus may further include means for determining a packet departure pattern for the set of packets associated with the media content based on the indication of the processing delay. The apparatus may further include means for transmitting, to the second device, the set of packets based on the packet departure pattern. The apparatus may further include means for rendering the media content. The apparatus may further include means for generating the set of packets associated with the rendered media content, where transmitting the set of packets includes transmitting the generated set of packets. The apparatus may further include means for receiving, from the second device, a second indication of an adjustment to a time gap between the set of packets and a second set of packets associated with the media content. The apparatus may further include means for adjusting the time gap based on the second indication. The apparatus may further include means for transmitting, to the second device, a third set of packets based on the adjusted time gap.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, where reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for." Unless stated otherwise, the phrase "a processor" may refer to "any of one or more processors" (e.g., one processor of one or more processors, a number (greater than one) of processors in the one or more processors, or all of the one or more processors) and the phrase "a memory" may refer to "any of one or more memories" (e.g., one memory of one or more memories, a number (greater than one) of memories in the one or more memories, or all of the one or more memories).

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may include RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing at a first device, including: transmitting, to a second device, an indication of a processing delay associated with a set of packets associated with media content; and receiving, from the second device, the set of packets in a packet arrival pattern that is based on the processing delay.

Aspect 2 may be combined with aspect 1, wherein the media content includes at least one of audio content, video content, haptic content, or graphical content.

Aspect 3 may be combined with any of aspects 1-2, wherein the set of packets is associated with a pixel streaming application or a vector streaming application.

Aspect 4 may be combined with any of aspects 1-2, wherein the indication of the processing delay includes at least one of a rendering delay, a decoding delay, an error concealment delay, or a late stage reprojection (LSR) delay.

Aspect 5 may be combined with aspect 4, wherein the indication of the processing delay further includes at least one of a sum or a standard deviation of at least one of the rendering delay, the decoding delay, the error concealment delay, or the LSR delay.

Aspect 6 may be combined with any of aspects 1-5, wherein the packet arrival pattern corresponds to a time interval that occurs between each packet in the set of packets.

Aspect 7 may be combined with any of aspects 1-6, wherein transmitting the indication of the processing delay associated with the set of packets includes transmitting the indication of the processing delay via a session description protocol (SDP) during a multimedia session setup with the second device.

Aspect 8 may be combined with any of aspects 1-7, further including: presenting, based on the received set of packets, the media content via an output device.

Aspect 9 may be combined with aspect 8, wherein presenting the media content via the output device includes: transmitting the media content to the output device; or displaying the media content on the output device.

Aspect 10 may be combined with any of aspects 1-9, wherein the set of packets corresponds to a frame of video content, wherein the frame is associated with a display time duration, and wherein the packet arrival pattern is associated with each packet in the set of packets being evenly distributed throughout the display time duration.

Aspect 11 may be combined with any of aspects 1-9, wherein the set of packets corresponds to a frame of video content, wherein the frame is associated with a display time duration, and wherein the packet arrival pattern is associated with each packet in the set of packets being unevenly distributed throughout the display time duration.

Aspect 12 may be combined with any of aspects 1-11, further including: comparing the processing delay to a time gap between the set of packets and a second set of packets associated with the media content; transmitting, to the second device, a second indication of an adjustment to the time gap based on the comparison; and receiving, from the second device, a third set of packets based on the adjustment to the time gap.

Aspect 13 may be combined with aspect 12, wherein the comparison indicates that the time gap is less than the processing delay, and wherein the second indication of the adjustment to the time gap indicates that the time gap is to be increased.

Aspect 14 may be combined with aspect 12, wherein the comparison indicates that the time gap is greater than the processing delay by a threshold, and wherein the second indication of the adjustment to the time gap indicates that the time gap is to be decreased.

Aspect 15 may be combined with any of aspects 12-14, wherein transmitting the second indication of the adjustment to the time gap includes transmitting the second indication of the adjustment to the time gap (1) via a session description protocol (SDP) or (2) via a real-time transport protocol (RTP) header extension in a packet.

Aspect 16 is an apparatus for graphics processing including a processor coupled to a memory and, based on information stored in the memory, the processor is configured to implement a method as in any of aspects 1-15.

Aspect 17 may be combined with aspect 16 and includes that the apparatus is a wireless communication device comprising at least one of a transceiver or an antenna coupled to the processor, wherein to receive the set of packets, the processor is configured to receive the set of packets via at least one of the transceiver or the antenna.

Aspect 18 is an apparatus for graphics processing including means for implementing a method as in any of aspects 1-15.

Aspect 19 is a computer-readable medium (e.g., a non-transitory computer-readable medium) storing computer executable code, the computer executable code, when executed by a processor, causes the processor to implement a method as in any of aspects 1-15.

Aspect 20 is a method of graphics processing at a first device, including: receiving, from a second device, an indication of a processing delay associated with a set of packets associated with media content; determining a packet departure pattern for the set of packets associated with the media content based on the indication of the processing delay; and transmitting, to the second device, the set of packets based on the packet departure pattern.

Aspect 21 may be combined with aspect 20, wherein the media content includes at least one of audio content, video content, haptic content, or graphical content.

Aspect 22 may be combined with any of aspects 20-21, wherein the set of packets is associated with a pixel streaming application or a vector streaming application.

Aspect 23 may be combined with any of aspects 20-21, wherein the indication of the processing delay includes at least one of a rendering delay, a decoding delay, an error concealment delay, or a late stage reprojection (LSR) delay.

Aspect 24 may be combined with aspect 23, wherein the indication of the processing delay further includes at least one of a sum or a standard deviation of at least one of the rendering delay, the decoding delay, the error concealment delay, or the LSR delay.

Aspect 25 may be combined with any of aspects 20-24, wherein the packet departure pattern corresponds to a time interval that occurs between each packet in the set of packets.

Aspect 26 may be combined with any of aspects 20-25, wherein receiving the indication of the processing delay associated with the set of packets includes receiving the indication of the processing delay via a session description protocol (SDP) during a multimedia session setup with the second device.

Aspect 27 may be combined with any of aspects 20-26, further including: rendering the media content; and generating the set of packets associated with the rendered media content, wherein transmitting the set of packets includes transmitting the generated set of packets.

Aspect 28 may be combined with any of aspects 20-27, wherein the set of packets corresponds to a frame of video content, wherein the frame is associated with a display time duration, and wherein the packet departure pattern is associated with each packet in the set of packets being evenly distributed throughout the display time duration.

Aspect 29 may be combined with any of aspects 20-27, wherein the set of packets corresponds to a frame of video content, wherein the frame is associated with a display time duration, and wherein the packet departure pattern is associated with each packet in the set of packets being unevenly distributed throughout the display time duration.

Aspect 30 may be combined with any of aspects 20-29, further including: receiving, from the second device, a second indication of an adjustment to a time gap between the set of packets and a second set of packets associated with the media content; adjusting the time gap based on the second indication; and transmitting, to the second device, a third set of packets based on the adjusted time gap.

Aspect 31 may be combined with aspect 30, wherein receiving the second indication of the adjustment to the time gap includes receiving the second indication of the adjustment to the time gap (1) via a session description protocol (SDP) or (2) via a real-time transport protocol (RTP) header extension in a packet.

Aspect 32 is an apparatus for graphics processing including a processor coupled to a memory and, based on information stored in the memory, the processor is configured to implement a method as in any of aspects 20-31.

Aspect 33 may be combined with aspect 32 and includes that the apparatus is a wireless communication device comprising at least one of a transceiver or an antenna coupled to the processor, wherein to transmit the set of packets, the processor is configured to transmit the set of packets via at least one of the transceiver or the antenna.

Aspect 34 is an apparatus for graphics processing including means for implementing a method as in any of aspects 20-31.

Aspect 35 is a computer-readable medium (e.g., a non-transitory computer-readable medium) storing computer executable code, the computer executable code, when executed by a processor, causes the processor to implement a method as in any of aspects 20-31.

Various aspects have been described herein. These and other aspects are within the scope of the following claims.

What is claimed is:

1. An apparatus for graphics processing at a first device, comprising:

a memory; and a processor coupled to the memory and, based on information stored in the memory, the processor is configured to:

transmit, to a second device, an indication of a processing delay at the first device associated with a set of packets associated with media content; and receive, from the second device, the set of packets in a packet arrival pattern, wherein the packet arrival pattern comprises a time gap between a first received packet and a second received packet of the received set of packets, wherein the second received packet is received consecutively after a receipt of the first received packet, wherein the time gap is based on the processing delay at the first device.

2. The apparatus of claim 1, wherein the media content comprises at least one of audio content, video content, haptic content, or graphical content.

3. The apparatus of claim 1, wherein the set of packets is associated with a pixel streaming application or a vector streaming application.

4. The apparatus of claim 1, wherein the indication of the processing delay comprises at least one of:

a rendering delay;
a decoding delay;
an error concealment delay; or
a late stage reprojection (LSR) delay.

5. The apparatus of claim 4, wherein the indication of the processing delay further comprises at least one of a sum or a standard deviation of at least one of the rendering delay, the decoding delay, the error concealment delay, or the LSR delay.

6. The apparatus of claim 1, wherein, to receive the set of packets in the packet arrival pattern, the processor is configured to:

receive a first set of packets associated with a first frame and a second set of packets associated with a second frame, wherein the first received packet comprises a last packet of the first set of packets and the second received packet comprises a first packet of the second set of packets.

7. The apparatus of claim 1, wherein, to transmit the indication of the processing delay at the first device associated with the set of packets, the processor is configured to:

transmit the indication of the processing delay at the first device via a session description protocol (SDP) during a multimedia session setup with the second device.

8. The apparatus of claim 1, wherein the processor is further configured to:

present, based on the received set of packets, the media content via an output device.

9. The apparatus of claim 8, wherein to present the media content via the output device, the processor is configured to:

transmit the media content to the output device; or
display the media content on the output device.

10. The apparatus of claim 1, wherein the set of packets corresponds to a frame of video content, wherein the frame is associated with a display time duration, and wherein the packet arrival pattern is associated with each packet in the set of packets being evenly distributed throughout the display time duration.

11. The apparatus of claim 1, wherein the set of packets corresponds to a frame of video content, wherein the frame is associated with a display time duration, and wherein the packet arrival pattern is associated with each packet in the set of packets being unevenly distributed throughout the display time duration.

12. The apparatus of claim 1, wherein the processor is further configured to:

compare the processing delay to a second time gap between a first set of packets and a second set of packets associated with the media content, wherein, to transmit, to the second device, the indication of the processing delay at the first device, the processor is configured to:

transmit, to the second device, a second indication of an adjustment to the second time gap based on the comparison, wherein, to receive, from the second device, the set of packets in the packet arrival pattern, the processor is configured to:

receive, from the second device, the set of packets in the packet arrival pattern based on the adjustment to the second time gap.

13. The apparatus of claim 12, wherein the comparison indicates that the second time gap is less than the processing delay, and wherein the second indication of the adjustment to the second time gap indicates that the second time gap is to be increased to the time gap.

14. The apparatus of claim 12, wherein the comparison indicates that the second time gap is greater than the processing delay, and wherein the second indication of the adjustment to the second time gap indicates that the time gap is to be decreased to the time gap.

15. The apparatus of claim 12, wherein, to transmit the second indication of the adjustment to the second time gap, the processor is configured to:

transmit (1) a session description protocol (SDP) packet or (2) a real-time transport protocol (RTP) header extension packet comprising the second indication of the adjustment to the second time gap.

16. The apparatus of claim 1, wherein the apparatus comprises a wireless communication device comprising at least one of a transceiver or an antenna coupled to the processor, wherein, to receive the set of packets in the packet arrival pattern, the processor is configured to:

receive the set of packets in the packet arrival pattern via at least one of the transceiver or the antenna.

17. An apparatus for graphics processing at a first device, comprising:

a memory; and
a processor coupled to the memory and, based on information stored in the memory, the processor is configured to:

receive, from a second device, an indication of a processing delay at the second device associated with a set of packets associated with media content;

determine a packet departure pattern for the set of packets associated with the media content based on the received indication of the processing delay at the second device, wherein the packet departure pattern comprises a time gap between a first packet and a second packet of the set of packets; and transmit, to the second device, the set of packets based on the determined packet departure pattern, wherein the transmitted set of packets comprises the second packet transmitted consecutively after a transmission of the first packet.

18. The apparatus of claim 17, wherein the media content comprises at least one of audio content, video content, haptic content, or graphical content.

19. The apparatus of claim 17, wherein the set of packets is associated with a pixel streaming application or a vector streaming application.

20. The apparatus of claim 17, wherein the indication of the processing delay comprises at least one of:

a rendering delay;
a decoding delay;
an error concealment delay; or
a late stage reprojection (LSR) delay.

21. The apparatus of claim 20, wherein the indication of the processing delay further comprises at least one of a sum or a standard deviation of at least one of the rendering delay, the decoding delay, the error concealment delay, or the LSR delay.

22. The apparatus of claim 17, wherein, to transmit the set of packets based on the packet departure pattern, the processor is configured to:

transmit a first set of packets associated with a first frame and a second set of packets associated with a second frame, wherein the first packet comprises a last packet of the first set of packets and the second packet comprises a first packet of the second set of packets.

23. The apparatus of claim 17, wherein, to receive the indication of the processing delay at the second device associated with the set of packets, the processor is configured to:

receive the indication of the processing delay at the second device via a session description protocol (SDP) during a multimedia session setup with the second device.

24. The apparatus of claim 17, wherein the processor is further configured to:

render the media content; and generate the set of packets associated with the rendered media content, wherein, to transmit the set of packets, the processor is configured to;

transmit the generated set of packets.

25. The apparatus of claim 17, wherein the set of packets corresponds to a frame of video content, wherein the frame is associated with a display time duration, and wherein the packet departure pattern is associated with each packet in the set of packets being evenly distributed throughout the display time duration.

26. The apparatus of claim 17, wherein the set of packets corresponds to a frame of video content, wherein the frame is associated with a display time duration, and wherein the packet departure pattern is associated with each packet in the set of packets being unevenly distributed throughout the display time duration.

27. The apparatus of claim 17, wherein, to receive, from the second device, the indication of the processing delay at the second device, the processor is configured to:

receive, from the second device, a second indication of an adjustment to a second time gap between a first set of packets and a second set of packets associated with the media content, wherein, to determine the packet departure pattern for the set of packets associated with the media content based on the received indication of the processing delay at the second device, the processor is configured to:

adjust the second time gap to the time gap based on the second indication, wherein, to transmit, to the second device, the set of packets based on the determined packet departure pattern, the processor is configured to:

transmit, to the second device, the set of packets based on the adjusted second time gap.

28. The apparatus of claim 17, wherein the apparatus comprises a wireless communication device comprising at least one of a transceiver or an antenna coupled to the processor, wherein, to transmit the set of packets based on the determined packet departure pattern, the processor is configured to;

transmit the set of packets based on the determined packet departure pattern via at least one of the transceiver or the antenna.

29. A method of graphics processing at a first device, comprising:

transmitting, to a second device, an indication of a processing delay at the first device associated with a set of packets associated with media content; and receiving, from the second device, the set of packets in a packet arrival pattern, wherein the packet arrival pattern comprises a time gap between a first received packet and a second received packet of the received set of packets, wherein the second received packet is received consecutively after a receipt of the first received packet, wherein the time gap is based on the processing delay at the first device.

30. A method of graphics processing at a first device, comprising:

receiving, from a second device, an indication of a processing delay at the second device associated with a set of packets associated with media content;

determining a packet departure pattern for the set of packets associated with the media content based on the received indication of the processing delay at the second device, wherein the packet departure pattern comprises a time gap between a first packet and a second packet of the set of packets; and transmitting, to the second device, the set of packets based on the determined packet departure pattern, wherein the transmitted set of packets comprises the second packet transmitted consecutively after a transmission of the first packet.

* * * * *